US012713350B2

(12) United States Patent
Lee et al.

(10) Patent No.: US 12,713,350 B2
(45) Date of Patent: Aug. 18, 2026

(54) METHOD FOR TRANSMITTING AND RECEIVING DOWNLINK CONTROL CHANNEL AND APPARATUS THEREFOR

(71) Applicant: LG ELECTRONICS INC., Seoul (KR)

(72) Inventors: Sunghoon Lee, Seoul (KR); Jaehyung Kim, Seoul (KR); Seunggye Hwang, Seoul (KR); Youngdae Lee, Seoul (KR)

(73) Assignee: LG Electronics Inc., Seoul (KR)

( * ) Notice: Subject to any disclaimer, the term of this patent is extended or adjusted under 35 U.S.C. 154(b) by 336 days.

(21) Appl. No.: 18/681,761

(22) PCT Filed: Jul. 26, 2022

(86) PCT No.: PCT/KR2022/010960
§ 371 (c)(1),
(2) Date: Feb. 6, 2024

(87) PCT Pub. No.: WO2023/013951
PCT Pub. Date: Feb. 9, 2023

(65) Prior Publication Data
US 2024/0349187 A1 Oct. 17, 2024

(30) Foreign Application Priority Data
Aug. 6, 2021 (KR) ........................ 10-2021-0103889

(51) Int. Cl.
*H04W 52/02* (2009.01)

(52) U.S. Cl.
CPC ............................... *H04W 52/0229* (2013.01)

(58) Field of Classification Search
CPC ..................................................... H04W 52/02
See application file for complete search history.

(56) References Cited

U.S. PATENT DOCUMENTS

2012/0257559 A1* 10/2012 Kim ...................... H04L 1/1835 370/311
2018/0332655 A1* 11/2018 Ang .................. H04W 52/0216

FOREIGN PATENT DOCUMENTS

WO WO 2020/204804 10/2020

OTHER PUBLICATIONS

3GPP TS 38.213 V16.6.0 (Jun. 2021), 3rd Generation Partnership Project Technical Specification Group Radio Access Network, study on Physical layer procedures for control (Release 16), Jun. 2021, 187 pages.

(Continued)

*Primary Examiner* — Mohammad S Anwar
(74) *Attorney, Agent, or Firm* — Fish & Richardson P.C.

(57) ABSTRACT

The present disclosure discloses a method by which a terminal receives downlink control information (DCI) in a wireless communication system. Particularly, the method is characterized by: receiving first information related to discontinuous reception (DRX); a timer for a DRX active time running on the basis of the first information; receiving, on the basis of the DRX active time, second information related to physical downlink control channel (PDCCH) monitoring adaptation; performing, on the basis of the second information, the PDCCH monitoring adaptation during a certain duration; and on the basis of a PDCCH monitoring occasion for a wake-up signal (WUS) being included within a duration in which the DRX active time and the certain duration overlap each other, receiving DCI including the WUS on the PDCCH monitoring occasion.

13 Claims, 16 Drawing Sheets

(56) References Cited

OTHER PUBLICATIONS

CATT, "PDCCH monitoring adaptation," 3GPP TSG RAN WG1 #104-e, R1-2100395, e-Meeting, Jan. 25-Feb. 5, 2021, 5 pages.
International Search Report and Written Opinion in Appln. No. PCT/KR2022/010960, mailed on Nov. 7, 2022, 13 pages (with English translation).
LG Electronics, "Discussion on DCI-based power saving adaptation during DRX Active Time," 3GPP TSG RAN WG1 #105-e, R1-2105436, e-Meeting, May 10-27, 2021, 7 pages.
Panasonic, "Potential extension(s) to Rel-16 DCI-based power saving adaptation during DRX Active Time," 3GPP TSG-RAN WG1 #105-e, R1-2105476, e-Meeting, May 10-27, 2021, 5 pages.
Huawei, HiSilicon, "Extension(s) to Rel-16 DCI-based power saving adaptation for an active Bwp," R1-2005264, 3GPP TSG RAN WG1 Meeting #102-e, E-meeting, Aug. 17-28, 2020, 7 pages.
Office Action in Korean Appln. No. 10-2024-7003058, mailed on Mar. 23, 2026, 10 pages (with English translation).

* cited by examiner

METHOD FOR TRANSMITTING AND RECEIVING DOWNLINK CONTROL CHANNEL AND APPARATUS THEREFOR

CROSS-REFERENCE TO RELATED APPLICATIONS

This application is a national phase application under 35 U.S.C. § 371 of International Application No. PCT/KR2022/010960, filed on Jul. 26, 2022, which claims the benefit of Korean Patent Application No. 10-2021-0103889, filed on Aug. 6, 2021. The disclosures of the prior applications are incorporated by reference in their entirety.

TECHNICAL FIELD

The present disclosure relates to a method of transmitting and receiving a downlink control channel and apparatus therefor, and more particularly, to a method of transmitting and receiving downlink control information (DCI) for a wake-up signal within a discontinuous reception (DRX) active time and apparatus therefor.

BACKGROUND

As more and more communication devices demand larger communication traffic along with the current trends, a future-generation 5th generation (5G) system is required to provide an enhanced wireless broadband communication, compared to the legacy LTE system. In the future-generation 5G system, communication scenarios are divided into enhanced mobile broadband (eMBB), ultra-reliability and low-latency communication (URLLC), massive machine-type communication (mMTC), and so on.

Herein, eMBB is a future-generation mobile communication scenario characterized by high spectral efficiency, high user experienced data rate, and high peak data rate, URLLC is a future-generation mobile communication scenario characterized by ultra-high reliability, ultra-low latency, and ultra-high availability (e.g., vehicle to everything (V2X), emergency service, and remote control), and mMTC is a future-generation mobile communication scenario characterized by low cost, low energy, short packet, and massive connectivity (e.g., Internet of things (IoT)).

SUMMARY

An object of the present disclosure is to provide a method of transmitting and receiving a downlink control channel and an apparatus therefor.

Additional advantages, objects, and features of the disclosure will be set forth in part in the description which follows and in part will become apparent to those having ordinary skill in the art upon examination of the following or may be learned from practice of the disclosure. The objectives and other advantages of the disclosure may be realized and attained by the structure particularly pointed out in the written description and claims hereof as well as the appended drawings.

In an aspect of the present disclosure, provided herein is a method of receiving downlink control information (DCI) by a user equipment (UE) in a wireless communication system. The method may include: receiving first information on discontinuous reception (DRX); running a timer for a DRX active time based on the first information; receiving second information on physical downlink control channel (PDCCH) monitoring adaptation based on the DRX active time; performing the PDCCH monitoring adaptation for a predetermined duration based on the second information; and based on inclusion of a PDCCH monitoring occasion for a wake-up signal (WUS) within a duration in which the DRX active time and the predetermined duration overlap with each other, receiving DCI including the WUS on the PDCCH monitoring occasion.

In this case, the overlapping duration may not be considered as the DRX active time.

Additionally, the DCI may be received even based on that the overlapping duration is considered as the DRX active time.

Additionally, the DCI may be received based on a power saving radio network temporary identifier (PS-RNTI).

Additionally, the DCI may be received based on a cell radio network temporary identifier (C-RNTI), and the DCI may haves a different format from DCI format 2_6.

Additionally, the PDCCH monitoring occasion may correspond to a Type3-PDCCH common search space (CSS).

In another aspect of the present disclosure, provided herein is a UE configured to receive DCI in a wireless communication system. The UE may include: at least one transceiver; at least one processor; and at least one memory operably connected to the at least one processor and configured to store instructions that, when executed, cause the at least one processor to perform operations. The operations may include: receiving first information on DRX through the at least one transceiver; running a timer for a DRX active time based on the first information; receiving second information on PDCCH monitoring adaptation through the at least one transceiver based on the DRX active time; performing the PDCCH monitoring adaptation for a predetermined duration based on the second information; and based on inclusion of a PDCCH monitoring occasion for a WUS within a duration in which the DRX active time and the predetermined duration overlap with each other, receiving DCI including the WUS on the PDCCH monitoring occasion through the at least one transceiver.

In this case, the overlapping duration may not be considered as the DRX active time.

Additionally, the DCI may be received even based on that the overlapping duration is considered as the DRX active time.

Additionally, the DCI may be received based on a PS-RNTI.

Additionally, the DCI may be received based on a C-RNTI, and the DCI may haves a different format from DCI format 2_6.

Additionally, the PDCCH monitoring occasion may correspond to a Type3-PDCCH CSS.

In another aspect of the present disclosure, provided herein is an apparatus configured to receive DCI in a wireless communication system. The apparatus may include: at least one processor; and at least one memory operably connected to the at least one processor and configured to store instructions that, when executed, cause the at least one processor to perform operations. The operations may include: receiving first information on DRX; running a timer for a DRX active time based on the first information; receiving second information on PDCCH monitoring adaptation based on the DRX active time; performing the PDCCH monitoring adaptation for a predetermined duration based on the second information; and based on inclusion of a PDCCH monitoring occasion for a WUS within a duration in which the DRX active time and the predetermined duration overlap with each other, receiving DCI including the WUS on the PDCCH monitoring occasion.

In another aspect of the present disclosure, provided herein is a computer-readable storage medium comprising at least one computer program that causes at least one processor to perform operations. The operations may include: receiving first information on DRX; running a timer for a DRX active time based on the first information; receiving second information on PDCCH monitoring adaptation based on the DRX active time; performing the PDCCH monitoring adaptation for a predetermined duration based on the second information; and based on inclusion of a PDCCH monitoring occasion for a WUS within a duration in which the DRX active time and the predetermined duration overlap with each other, receiving DCI including the WUS on the PDCCH monitoring occasion.

In another aspect of the present disclosure, provided herein is a method of transmitting DCI by a base station (BS) in a wireless communication system. The method may include: transmitting first information on DRX; transmitting second information on PDCCH monitoring adaptation based on a DRX active time, wherein the DRX active time is based on the first information; and based on inclusion of a PDCCH monitoring occasion for a WUS within a duration in which the DRX active time overlaps with a predetermined duration in which the PDCCH monitoring adaptation is performed based on the second information, transmitting DCI including the WUS on the PDCCH monitoring occasion.

In a further aspect of the present disclosure, provided herein is a BS configured to transmit DCI in a wireless communication system. The BS may include: at least one transceiver; at least one processor; and at least one memory operably connected to the at least one processor and configured to store instructions that, when executed, cause the at least one processor to perform operations. The operations may include: transmitting first information on DRX through the at least one transceiver; transmitting second information on PDCCH monitoring adaptation through the at least one transceiver based on a DRX active time, wherein the DRX active time is based on the first information; and based on inclusion of a PDCCH monitoring occasion for a WUS within a duration in which the DRX active time overlaps with a predetermined duration in which the PDCCH monitoring adaptation is performed based on the second information, transmitting DCI including the WUS on the PDCCH monitoring occasion through the at least one transceiver.

According to the present disclosure, when a DCP occasion allocated within a discontinuous reception (DRX) active time is located within a duration in which physical downlink control channel (PDCCH) monitoring adaptation is applied, it is possible to appropriately determine whether monitoring is performed on the DCP occasion (DCP stands for DCI with CRC scrambled by PS-RNTI, where CRC stands for cyclic redundancy check and PS-RNTI stands for power saving radio network temporary identifier), thereby expecting improvement in power consumption efficiency.

It is to be understood that both the foregoing general description and the following detailed description of the present disclosure are exemplary and explanatory and are intended to provide further explanation of the disclosure as claimed.

DETAILED DESCRIPTION

Figure 1:
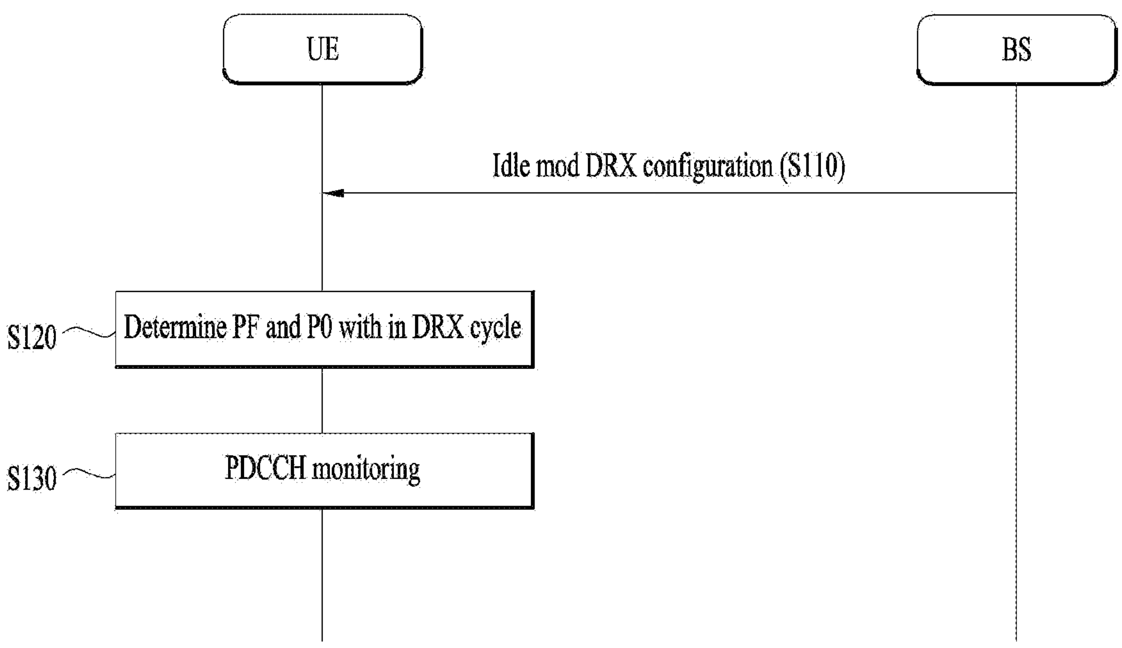
FIGS. 1 and 2 are diagrams for explaining idle mode discontinuous reception (DRX) operation.

The following technology may be used in various wireless access systems such as code division multiple access (CDMA), frequency division multiple access (FDMA), time division multiple access (TDMA), orthogonal frequency division multiple access (OFDMA), single carrier frequency division multiple access (SC-FDMA), and so on. CDMA may be implemented as a radio technology such as universal terrestrial radio access (UTRA) or CDMA2000. TDMA may be implemented as a radio technology such as global system for mobile communications (GSM)/general packet radio service (GPRS)/enhanced data rates for GSM evolution (EDGE). OFDMA may be implemented as a radio technology such as institute of electrical and electronics engineers (IEEE) 802.11 (wireless fidelity (Wi-Fi)), IEEE 802.16 (worldwide interoperability for microwave access (WiMAX)), IEEE 802.20, evolved UTRA (E-UTRA), and so on. UTRA is a part of universal mobile telecommunications system (UMTS). 3rd generation partnership project (3GPP) long term evolution (LTE) is a part of evolved UMTS (E-UMTS) using E-UTRA, and LTE-advanced (LTE-A) is an evolution of 3GPP LTE. 3GPP new radio or new radio access technology (NR) is an evolved version of 3GPP LTE/LTE-A.

While the following description is given in the context of a 3GPP communication system (e.g., NR) for clarity, the technical spirit of the present disclosure is not limited to the 3GPP communication system. For the background art, terms, and abbreviations used in the present disclosure, refer to the technical specifications published before the present disclosure (e.g., 38.211, 38.212, 38.213, 38.214, 38.300, 38.331, and so on).

5G communication involving a new radio access technology (NR) system will be described below.

Three key requirement areas of 5G are (1) enhanced mobile broadband (eMBB), (2) massive machine type communication (mMTC), and (3) ultra-reliable and low latency communications (URLLC).

Some use cases may require multiple dimensions for optimization, while others may focus only on one key performance indicator (KPI). 5G supports such diverse use cases in a flexible and reliable way.

eMBB goes far beyond basic mobile Internet access and covers rich interactive work, media and entertainment applications in the cloud or augmented reality (AR). Data is one of the key drivers for 5G and in the 5G era, we may for the first time see no dedicated voice service. In 5G, voice is expected to be handled as an application program, simply using data connectivity provided by a communication system. The main drivers for an increased traffic volume are the increase in the size of content and the number of applications requiring high data rates. Streaming services (audio and video), interactive video, and mobile Internet connectivity will continue to be used more broadly as more devices connect to the Internet. Many of these applications require always-on connectivity to push real time information and notifications to users. Cloud storage and applications are rapidly increasing for mobile communication platforms. This is applicable for both work and entertainment. Cloud storage is one particular use case driving the growth of uplink data rates. 5G will also be used for remote work in the cloud which, when done with tactile interfaces, requires much lower end-to-end latencies in order to maintain a good user experience. Entertainment, for example, cloud gaming and video streaming, is another key driver for the increasing need for mobile broadband capacity. Entertainment will be very essential on smart phones and tablets everywhere, including high mobility environments such as trains, cars and airplanes. Another use case is AR for entertainment and information search, which requires very low latencies and significant instant data volumes.

One of the most expected 5G use cases is the functionality of actively connecting embedded sensors in every field, that is, mMTC. It is expected that there will be 20.4 billion potential Internet of things (IoT) devices by 2020. In industrial IoT, 5G is one of areas that play key roles in enabling smart city, asset tracking, smart utility, agriculture, and security infrastructure.

URLLC includes services which will transform industries with ultra-reliable/available, low latency links such as remote control of critical infrastructure and self-driving vehicles. The level of reliability and latency are vital to smart-grid control, industrial automation, robotics, drone control and coordination, and so on.

Now, multiple use cases in a 5G communication system including the NR system will be described in detail.

5G may complement fiber-to-the home (FTTH) and cable-based broadband (or data-over-cable service interface specifications (DOCSIS)) as a means of providing streams at data rates of hundreds of megabits per second to giga bits per second. Such a high speed is required for TV broadcasts at or above a resolution of 4K (6K, 8K, and higher) as well as virtual reality (VR) and AR. VR and AR applications mostly include immersive sport games. A special network configuration may be required for a specific application program. For VR games, for example, game companies may have to integrate a core server with an edge network server of a network operator in order to minimize latency.

The automotive sector is expected to be a very important new driver for 5G, with many use cases for mobile communications for vehicles. For example, entertainment for passengers requires simultaneous high capacity and high mobility mobile broadband, because future users will expect to continue their good quality connection independent of their location and speed. Other use cases for the automotive sector are AR dashboards. These display overlay information on top of what a driver is seeing through the front window, identifying objects in the dark and telling the driver about the distances and movements of the objects. In the future, wireless modules will enable communication between vehicles themselves, information exchange between vehicles and supporting infrastructure and between vehicles and other connected devices (e.g., those carried by pedestrians). Safety systems may guide drivers on alternative courses of action to allow them to drive more safely and lower the risks of accidents. The next stage will be remote-controlled or self-driving vehicles. These require very reliable, very fast communication between different self-driving vehicles and between vehicles and infrastructure. In the future, self-driving vehicles will execute all driving activities, while drivers are focusing on traffic abnormality elusive to the vehicles themselves. The technical requirements for self-driving vehicles call for ultra-low latencies and ultra-high reliability, increasing traffic safety to levels humans cannot achieve.

Smart cities and smart homes, often referred to as smart society, will be embedded with dense wireless sensor networks. Distributed networks of intelligent sensors will identify conditions for cost- and energy-efficient maintenance of the city or home. A similar setup may be done for each home, where temperature sensors, window and heating controllers, burglar alarms, and home appliances are all connected wirelessly. Many of these sensors are typically characterized by low data rate, low power, and low cost, but for example, real time high definition (HD) video may be required in some types of devices for surveillance.

The consumption and distribution of energy, including heat or gas, is becoming highly decentralized, creating the need for automated control of a very distributed sensor network. A smart grid interconnects such sensors, using digital information and communications technology to gather and act on information. This information may include information about the behaviors of suppliers and consumers, allowing the smart grid to improve the efficiency, reliability, economics and sustainability of the production and distribution of fuels such as electricity in an automated fashion. A smart grid may be seen as another sensor network with low delays.

The health sector has many applications that may benefit from mobile communications. Communications systems enable telemedicine, which provides clinical health care at a distance. It helps eliminate distance barriers and may improve access to medical services that would often not be consistently available in distant rural communities. It is also used to save lives in critical care and emergency situations. Wireless sensor networks based on mobile communication may provide remote monitoring and sensors for parameters such as heart rate and blood pressure.

Wireless and mobile communications are becoming increasingly important for industrial applications. Wires are expensive to install and maintain, and the possibility of replacing cables with reconfigurable wireless links is a tempting opportunity for many industries. However, achieving this requires that the wireless connection works with a similar delay, reliability and capacity as cables and that its management is simplified. Low delays and very low error probabilities are new requirements that need to be addressed with 5G.

Finally, logistics and freight tracking are important use cases for mobile communications that enable the tracking of inventory and packages wherever they are by using location-based information systems. The logistics and freight tracking use cases typically require lower data rates but need wide coverage and reliable location information.

DRX (Discontinuous Reception) Operation

The UE uses Discontinuous Reception (DRX) in RRC_IDLE and RRC_INACTIVE state in order to reduce power consumption. When the DRX is configured, the UE performs a DRX operation according to DRX configuration information.

When the UE operates based on the DRX, the UE repeats ON/OFF for reception. For example, when the DRX is configured, the UE attempts to receive/detect the PDCCH (e.g., PDCCH monitoring) only in a predetermined time interval (e.g., ON), and does not attempt to receive the PDCCH in the remaining time period (e.g., OFF/sleep).

At this time, a time period during which the UE should attempt to receive the PDCCH is referred to as an On-duration, and this on-duration is defined once per DRX cycle. The UE can receive DRX configuration information from a gNB through a RRC signaling and operate as the DRX through a reception of the (Long) DRX command MAC CE.

The DRX configuration information may be included in the MAC-CellGroupConfig. The IE MAC-CellGroupConfig is used to configure MAC parameters for a cell group, including DRX.

DRX (Discontinuous Reception) means an operation mode for enabling a UE (User Equipment) to reduce battery consumption so that the UE can receive/monitor a downlink channel discontiguously. That is, a UE configured with DRX can reduce power consumption by receiving a DL signal discontiguously. The DRX operation is performed in a DRX cycle indicative of a time interval in which On Duration is periodically repeated. The DRX cycle includes On Duration and sleep duration (or Opportunity for DRX). The On Duration indicates a time interval in which a UE monitors a PDCCH in order to receive the PDCCH. DRX may be performed in an RRC (Radio Resource Control)_IDLE state (or mode), an RRC_INACTIVE state (or mode), or an RRC_CONNECTED state (or mode). In the RRC_IDLE state and the RRC_INACTIVE state, DRX is used to receive a paging signal discontiguously.

- RRC_Idle state: state in which a radio connection (RRC connection) is not established between a base station and a UE.
- RRC Inactive state: state in which a radio connection (RRC connection) has been established between a base station and a UE, but a radio connection is inactivated.
- RRC_Connected state: state in which a radio connection (RRC connection) has been established between a base station and a UE.

DRX is basically divided into Idle mode DRX, Connected DRX (C-DRX) and extended DRX. DRX applied in the RRC IDLE state is called Idle mode DRX, and DRX applied in the RRC CONNECTED state is called Connected mode DRX (C-DRX).

eDRX (Extended/enhanced DRX) is a mechanism capable of expanding the cycle of Idle mode DRX and C-DRX. In the Idle mode DRX, whether to permit eDRX may be configured based on system information (e.g., SIB1).

The SIB1 may include an eDRX-Allowed parameter. The eDRX-Allowed parameter is a parameter indicating whether Idle mode extended DRX is permitted.

(1) IDLE Mode DRX

In the IDLE mode, the UE may use DRX to reduce power consumption. One paging occasion (PO) may be a time interval (e.g., a slot or a subframe) in which a paging-radio network temporary identifier (P-RNTI) based physical downlink control channel (PDCCH) may be transmitted. The P-RNTI-based PDCCH may address/schedule a paging message. For P-RNTI-based PDCCH transmission, the PO may indicate a first subframe for PDCCH repetition.

One paging frame (PF) is one radio frame which may include one or a plurality of paging occasions. When DRX is used, a UE may be configured to monitor only one PO per DRX cycle. The PF, PO and/or PNB may be determined based on a DRX parameter provided via network signaling (e.g., system information).

Hereafter, 'PDCCH' may refer to MPDCCH, NPDCCH and/or normal PDCCH. Hereafter, 'UE' may refer to MTC UE, BL (Bandwidth reduced Low complexity)/CE (coverage enhanced) UE, NB-IoT UE, Reduced Capability (RedCap) UE, normal UE and/or IAB-MT (mobile termination).

FIG. 1 is a flowchart showing an example of a method of performing an Idle mode DRX operation.

A UE receives, from abase station, Idle mode DRX configuration information through a higher layer signaling (e.g., system information) (S110).

Furthermore, the UE determines a PF (Paging Frame) and a PO (Paging Occasion), for monitoring a physical downlink control channel (e.g., PDCCH) in a paging DRX cycle based on the Idle mode DRX configuration information (S120). In this case, the DRX cycle includes On Duration and sleep duration (or Opportunity for DRX).

Furthermore, the UE monitors a PDCCH in the PO of the determined PF (S130). The UE monitors only one time interval (PO) for each paging DRX cycle. For example, the time interval may be a slot or a subframe.

Additionally, if the UE receives a PDCCH (more exactly, CRC of PDCCH) scrambled by a P-RNTI during On duration (i.e., if paging is detected), the UE may transit to a connected mode and transmit or receive data with the base station.

Figure 2:
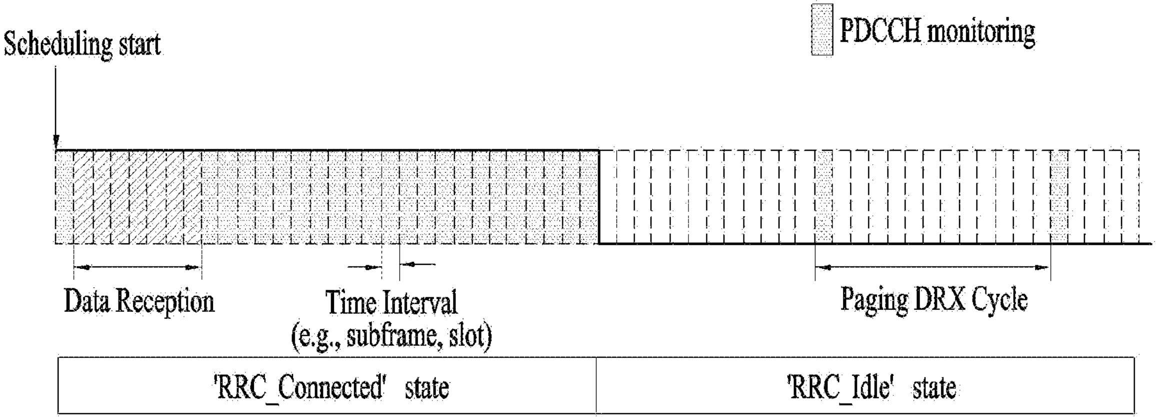

FIG. 2 is a diagram showing an example of an Idle mode DRX operation.

Referring to FIG. 2, if there is a traffic (data) toward a UE in the RRC_Idle state (hereinafter referred to as 'Idle state'), paging occurs toward the corresponding UE.

Thus, the UE wakes up every (paging) DRX cycle and monitors a PDCCH.

If Paging is present, the UE transits to a Connected state, and receives data. Otherwise, the UE may enter a sleep mode again.

(2) Connected Mode DRX (C-DRX)

C-DRX is DRX applied in the RRC Connected state. The DRX cycle of C-DRX may be configured with a Short DRX cycle and/or a Long DRX cycle. The Short DRX cycle is Optional.

If C-DRX is configured, a UE performs PDCCH monitoring for On Duration. If there is a PDCCH successfully detected during the PDCCH monitoring, the UE operates (or runs) an inactivity timer and maintains an awake state. In contrast, if there is no PDCCH successfully detected during the PDCCH monitoring, the UE enters to a sleep state after the On Duration is ended.

If C-DRX is configured, a PDCCH reception occasion (e.g., a slot having a PDCCH search space/candidate) may be configured discontiguously based on a C-DRX configuration. In contrast, if C-DRX is not configured, a PDCCH reception occasion (e.g., a slot having a PDCCH search space/candidate) may be configured contiguously in accordance with PDCCH search space configuration. Meanwhile, PDCCH monitoring may be limited in a time interval configured as a measurement gap, regardless of a C-DRX configuration.

Figure 3:
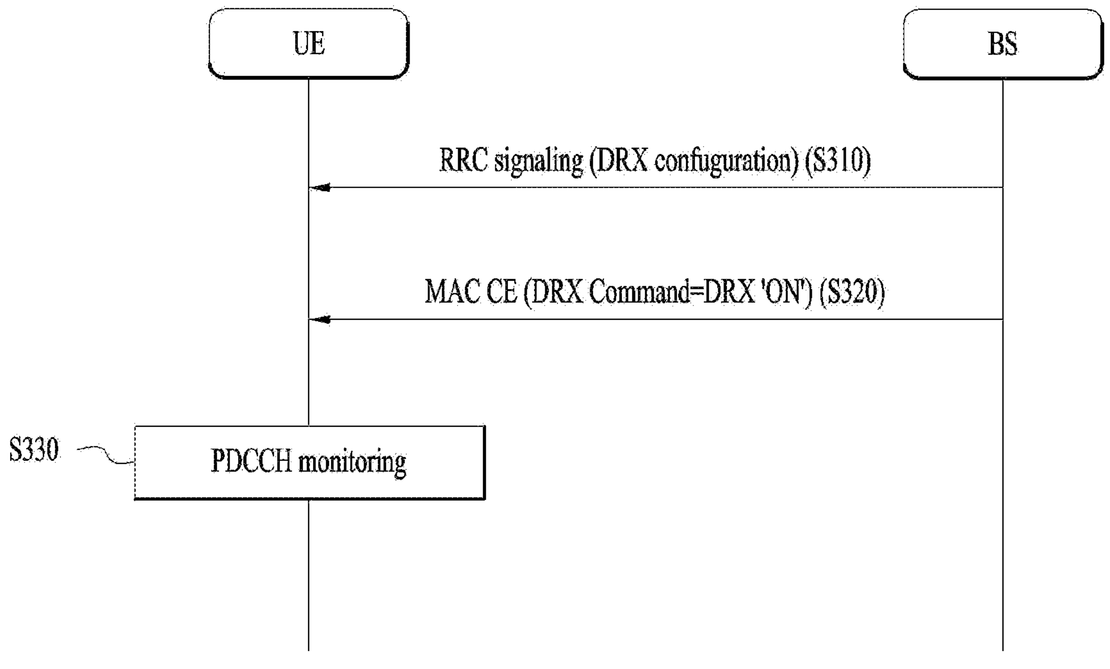
FIGS. 3 to 5 are diagrams for explaining DRX operation in a radio resource control (RRC) connected mode.

FIG. 3 is a flowchart showing an example of a method of performing a C-DRX operation.

A UE receives, from a base station, RRC signalling (e.g., MAC-MainConfig IE) including DRX configuration information (S310). The DRX configuration information may include the following information.

- on-duration: the duration that the UE waits for, after waking up, to receive PDCCHs. If the UE successfully decodes a PDCCH, the UE stays awake and starts the drx-inactivity timer;

onDurationTimer: the duration in which the DRX cycle starts. For example, the duration may refer to a time interval to be continuously monitored at the beginning of a DRX cycle, which may be represented in units of milliseconds (ms).

drx-InactivityTimer: the duration after the PDCCH occasion in which a PDCCH indicates a new UL or DL transmission for the MAC entity. For example, the duration may be a time interval represented in units of ms after the UE decodes the PDCCH including scheduling information. That is, the duration refers to a duration in which the UE waits to successfully decode another PDCCH after decoding the PDCCH. If no other PDCCHs are detected within the corresponding duration, the UE transitions to the sleep mode.

The UE restarts the drx-inactivity timer after successfully decoding a PDCCH for initial transmission only except for a PDCCH for retransmission.

drx-RetransmissionTimer: for DL, the maximum duration until a DL retransmission is received; for UL the maximum duration until a grant for UL retransmission is received. For example, for UL, drx-RetransmissionTimer indicates the number of slots in a bandwidth part (BWP) where a transport block (TB) to be retransmitted is transmitted. For DL, drx-RetransmissionTimer indicates the number of slots in a BWP in which a TB to be retransmitted is received.

longDRX-Cycle: On Duration occurrence period drxStartOffset: a subframe number in which a DRX cycle is started drxShortCycleTimer: the duration the UE shall follow the Short DRX cycle;

shortDRX-Cycle: a DRX cycle operating as much as a drxShortCycleTimer number when Drx-InactivityTimer is terminated drx-SlotOffset: the delay before drx-onDurationTimer starts. For example, the delay may be expressed in units of ms, and more particularly, in multiples of 1/32 ms.

Active time: total duration that the UE monitors PDCCH, which may include (a) the "on-duration" of the DRX cycle, (b) the time UE is performing continuous reception while the drx-inactivity timer has not expired, and (c) the time when the UE is performing continuous reception while waiting for a retransmission opportunity.

Specifically, when the DRX cycle is configured, an active time for a serving cell of a DRX group includes the following.

(a) drx-onDurationTimer or (b) drx-InactivityTimer configured for the DRX group is running; or (c) drx-RetransmissionTimerDL or drx-RetransmissionTimerUL is running on any Serving Cell in the DRX group; or (d) ra-ContentionResolutionTimer or msgB-ResponseWindow is running; or (e) a Scheduling Request is sent on PUCCH and is pending; or (f) a PDCCH indicating a new transmission addressed to the C-RNTI of the MAC entity has not been received after successful reception of a Random Access Response for the Random Access Preamble not selected by the MAC entity among the contention-based Random Access Preamble.

Furthermore, if DRX 'ON' is configured through the DRX command of a MAC CE (command element) (S320), the UE monitors a PDCCH for the ON duration of a DRX cycle based on the DRX configuration (S330).

Figure 4:
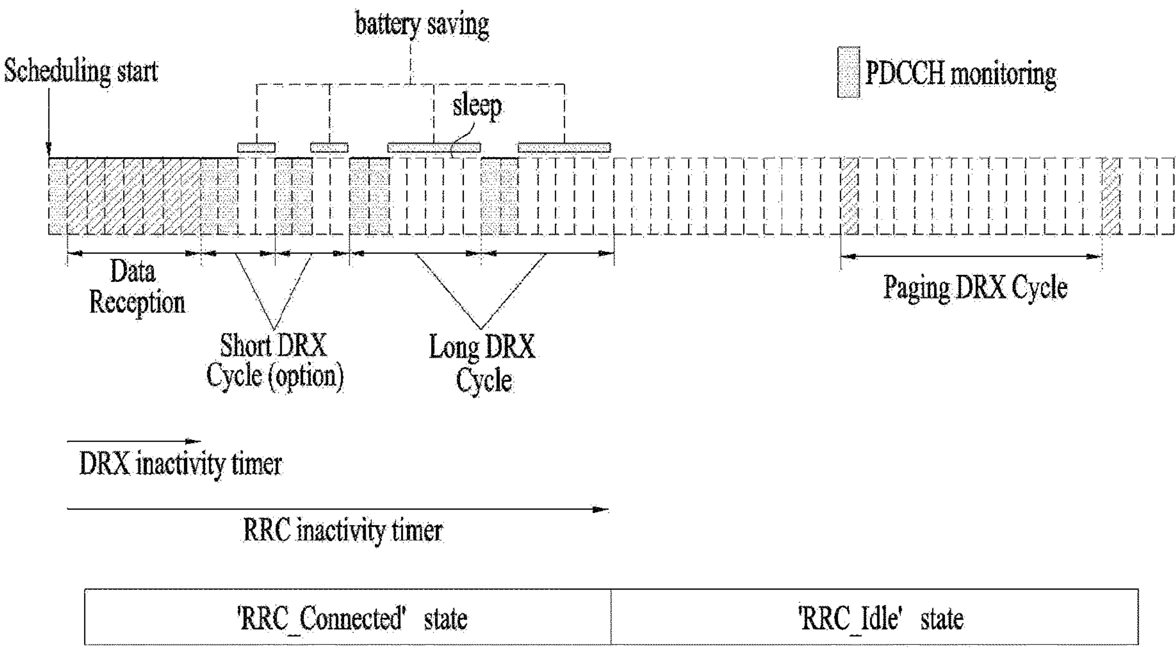

FIG. 4 is a diagram showing an example of a C-DRX operation.

Referring to FIG. 4 when the UE receives scheduling information (e.g., DL assignment or UL grant) in the RRC-_Connected state (hereinafter referred to as the connected state), the UE runs a DRX inactivity timer and an RRC inactivity timer.

After the DRX inactivity timer expires, a DRX mode starts. The UE wakes up in a DRX cycle and monitors a PDCCH during a predetermined time (on duration timer).

In this case, if Short DRX is configured, when the UE starts the DRX mode, the UE first starts in a short DRX cycle, and starts to a long DRX cycle after the short DRX cycle is terminated. The Long DRX cycle is a multiple of the short DRX cycle. In the short DRX cycle, the UE wakes up more frequently. After the RRC inactivity timer expires, the UE shifts to an Idle state and performs an Idle mode DRX operation.

Figure 5:
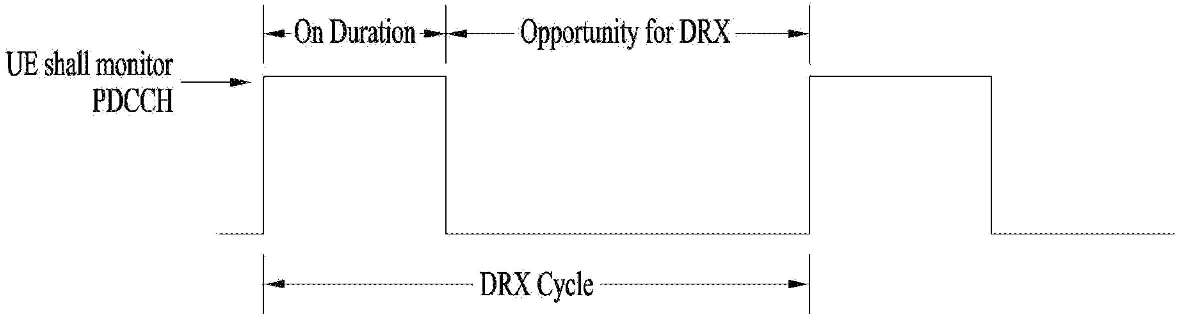

FIG. 5 illustrates a DRX cycle. The C-DRX operation has been introduced for power saving of the UE. If the UE receives no PDCCH within the on-duration defined for each DRX cycle, the UE enters the sleep mode until the next DRX cycle and does not perform transmission/reception.

On the other hand, when the UE receives a PDCCH within the on-duration, the active time may continue (or increase) based on the operations of an inactivity timer, a retransmission timer, etc. If the UE receives no additional data within the active time, the UE may operate in the sleep mode until the next DRX operation.

In NR, a wake-up signal (WUS) has been introduced to obtain additional power saving gain in addition to the existing C-DRX operation. The WUS may be to inform whether the UE needs to perform PDCCH monitoring within the on-duration of each DRX cycle (or a plurality of DRX cycles). If the UE detects no WUS on a specified or indicated WUS occasion, the UE may maintain the sleep mode without performing PDCCH monitoring in one or more DRX cycles associated with the corresponding WUS.

(3) WUS (DCI Format 2_6)

According to the power saving technology of Rel-16 NR systems, when the DRX operation is performed, it is possible to inform the UE whether the UE needs to wake up for each DRX cycle by DCI format 2_6.

Figure 6:
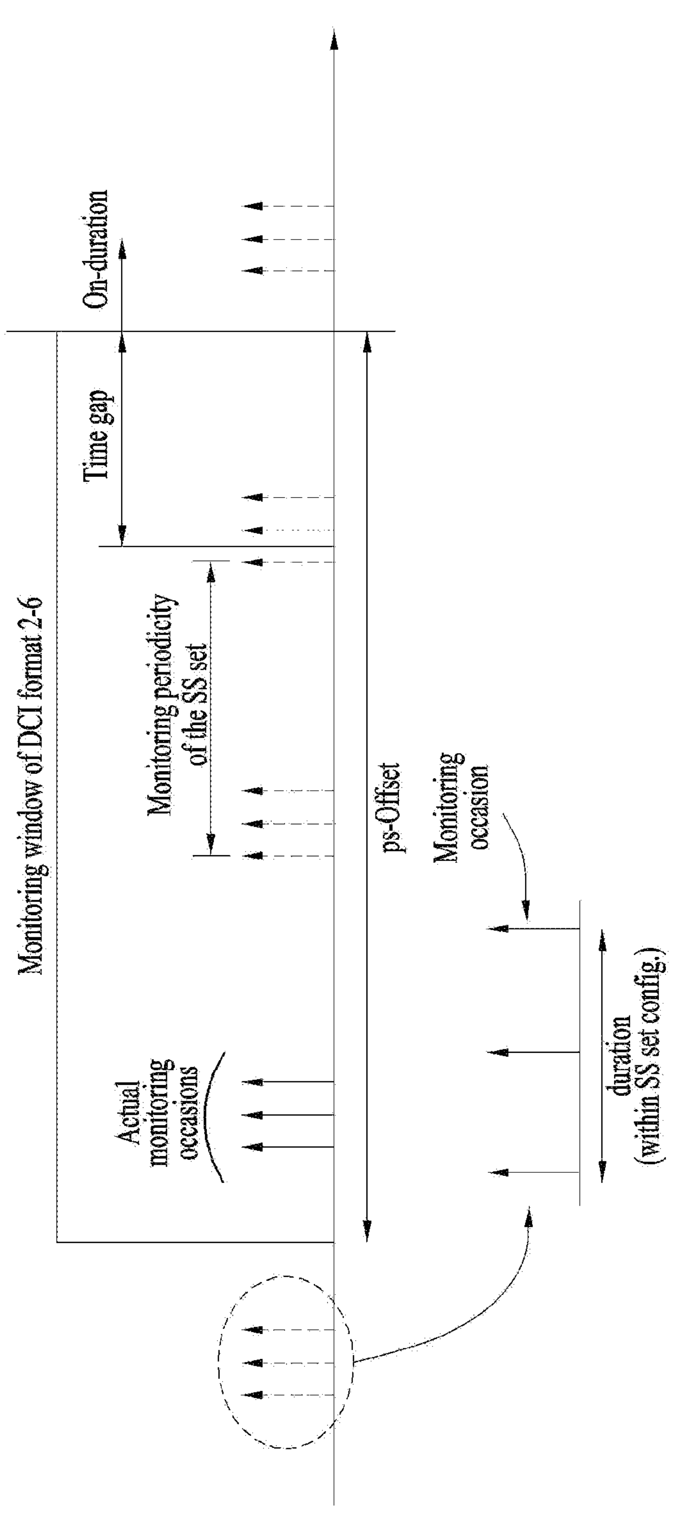
FIGS. 6 to 7 is a diagram for explaining a method of monitoring downlink control information (DCI) format 2_6.

Referring to FIG. 6, a PDCCH monitoring occasion for DCI format 2_6 may be determined by ps-Offset indicated by the network and a time gap reported by the UE. In this case, the time gap reported by the UE may be interpreted as a preparation period necessary for an operation after the UE wakes up.

Referring to FIG. 6, the base station (BS) may provide the UE with a search space (SS) set configuration capable of monitoring DCI format 2_6. According to the corresponding SS set configuration, DCI format 2_6 may be monitored in consecutive slots as long as the duration at the monitoring periodicity interval.

In the DRX configuration, a monitoring window for monitoring DCI format 2_6 may be determined by the start time of the DRX cycle (e.g., a point where the on-duration timer starts) and ps-Offset configured by the BS. In addition, PDCCH monitoring may not be required in the time gap reported by the UE. Consequently, an SS set monitoring occasion on which the UE actually performs monitoring may be determined as a first full duration (i.e., actual monitoring occasions of FIG. 6) within the monitoring window.

If the UE detects DCI format 2_6 in the monitoring window configured based on ps-Offset, the UE may be informed by the BS whether the UE wakes up in the next DRX cycle.

Search Space Set (SS Set) Group Switching

In the current NR standards, the SS set group switching has been defined to reduce the power consumption of the UE. According to the SS set group switching, the UE may be configured with a plurality of SS set groups, and an SS set group to be monitored by the UE among the plurality of SS set groups may be indicated. In addition, the UE may monitor an SS set included in the corresponding SS set group according to the corresponding indication and skip monitoring of SS sets not included in the corresponding SS set group.

For example, the UE may be provided with a list of SS set groups configured with a Type 3-PDCCH common search space (CSS) set and/or a user-specific search space (USS) set. In addition, if a list of SS set groups is provided, the UE may monitor SS sets corresponding to group index #0.

The UE may perform the SS set group switching operation depending on whether SearchSpaceSwitchTrigger is configured.

If SearchSpaceSwitchTrigger is configured for the UE, the UE may switch the SS set group according to the indication of DCI format 2_0.

For example, if the value of an SS Set Group Switching Flag field in DCI format 2_0 is 0, the UE may start monitoring SS set group #0 after a predetermined time from the time when the UE receives DCI format 2_0 and stop monitoring SS set group #1.

If the value of the SS Set Group Switching Flag field in DCI format 2_0 is 1, the UE may start monitoring SS set group #1 after a predetermined time from the time when the UE receives DCI format 2_0 and stop monitoring SS set group #0. If the UE starts monitoring SS set group #1, the UE may start counting a timer configured by SearchSpaceSwitchTimer. If the timer expires, the UE may start monitoring SS set group #0 after a predetermined time from the time when the timer expires and stop monitoring SS set group #1.

If SearchSpaceSwitchTrigger is not configured for the UE, the UE may change the SS set group based on DCI reception. For example, when the UE receives the DCI while monitoring SS set group #0 (or SS set group #1), the UE may start monitoring SS set group #1 (or SS set group #0) after a predetermined time from the time when the UE receives the DCI and stop monitoring SS set group #0 (or SS set group #1). In this case, the UE may start counting the timer configured by SearchSpaceSwitchTimer. If the timer expires, the UE may start monitoring SS set group #0 (or SS set group #1) after a predetermined time from the time when the timer expires and stop monitoring SS set group #1 (or SS set group #0).

Meanwhile, embodiments to be described later may be applied to, for example, extended reality (XR). XR is a concept that encompasses augmented reality (AR), virtual reality (VR), and mixed reality (MR). XR is characterized in that a timing when traffic is expected to be received is fixed to frames per second (fps) and traffic may be received later or earlier than the expected timing due to the influence of jitter. This jitter of XR traffic is represented as a truncated Gaussian probability distribution. Therefore, a power saving effect may be expected by cyclically configuring DRX according to fps. Even when DRX is not configured, if PDCCH monitoring adaptation is configured, the power saving effect may be expected only by PDCCH monitoring adaptation. It is apparent that the power saving effect may also be expected by configuring both DRX and PDCCH monitoring adaptation.

An expected traffic reception timing and an expected reception timing which is caused by the effect of jitter may be expressed as a probability, and embodiments to be described later may be applied to achieve the power saving effect in an XR environment as described above.

For example, since a jitter probability is low and thus a traffic reception probability is low at a timing which is relatively distant in time from the expected traffic reception timing, the UE may save power by sparsely monitoring a PDCCH. Conversely, since the jitter probability is high and thus the traffic reception probability is high at a timing which is close in time to the expected traffic reception timing, the UE may adjust power consumption according to the reception probability by densely monitoring the PDCCH. For this purpose, SS set group #0 may be configured as an SS set group including an SS set for dense PDCCH monitoring, and SS set group #1 may be configured as an SS set group including an SS set for sparse PDCCH monitoring. In other words, SS set Switching operation may be configured considering jitter in XR. In other words, an SS set switching operation may be configured considering jitter in XR.

As another example, the UE may repeat an operation of performing PDCCH monitoring during a short duration in which the traffic reception probability is high due to a high jitter probability and then entering micro-sleep. Therethrough, when traffic is not normally received, the UE may quickly enter micro-sleep to achieve power saving and then perform PDCCH monitoring to receive retransmitted traffic, thereby increasing the efficiency of PDCCH monitoring. In other words, a PDCCH monitoring skipping operation may be configured considering jitter in XR.

While the present disclosure proposes an operation through DCI reception within a DRX active time as an example, an operation of the same scheme may be applied to a UE for which DRX is not configured.

The present disclosure proposes the following UE operation: when the UE is instructed to perform the DRX operation, the UE monitors a PDCCH on DCP occasions included in a PDCCH monitoring adaptation duration within a DRX active time (DCP stands for DCI with CRC scrambled by PS-RNTI, where CRC stands for cyclic redundancy check and PS-RNTI stands for power saving radio network temporary identifier).

The UE may be configured with a maximum of 10 SS sets per BWP. The UE may monitor PDCCH candidates included in the SS sets (hereinafter referred to as SS set monitoring).

Considering that the UE needs to perform blind decoding (BD) on a PDCCH as the UE does not know at which point in time and in which DCI format the PDCCH will be received, PDCCH monitoring during the DRX operation accounts for a significant portion of power consumption.

As technology for power saving in a wireless communication system (e.g., Rel-17 NR system), PDCCH monitoring adaptation through which the UE adjusts the number of times of PDCCH monitoring in order to reduce power consumption within a DRX active time is under discussion. In general, PDCCH monitoring adaptation may mean an operation for reducing the number of times of PDCCH monitoring.

Examples of PDCCH monitoring adaptation include PDCCH monitoring skipping (hereinafter, skipping) and SS set group switching (hereinafter, switching). PDCCH monitoring skipping refers to temporarily suspending PDCCH monitoring for a specified duration (e.g., PDCCH monitoring skipping duration), and search space set group (SSSG) switching refers to dividing configured SS sets into multiple groups, switching to one of the multiple groups depending on the purpose of use, and monitoring SS sets included in the corresponding group.

In the present disclosure, SSSGs are divided into SSSG#0 and SSSG#1, for convenience of explanation. Herein, SSSG#0 is an SSSG that includes a relatively large number of SS sets or SS sets with relatively short periods to increase the PDCCH monitoring frequency when a large volume of data transmission is expected. SSSG#1 is an SSSG that includes a relatively small number of SS sets or SS sets with relatively long periods to reduce the PDCCH monitoring frequency for power saving.

For PDCCH monitoring adaptation, the BS may use various D formats to indicate information on the PDCCH monitoring adaptation to the UE. Upon receiving the corresponding indication, the UE may monitor a PDCCH based on the PDCCH monitoring adaptation. When the UE receives a PDCCH based on PDCCH monitoring, the UE may detect D included in the PDCCH.

According to the power saving technology of the Rel-16 NR system, when the UE performs the DRX operation, the UE may be notified whether the UE wakes up at each DRX cycle through DC format 2_6. Table 1 shows DCI format 2_6 defined in 3GPP TS 38.212.

TABLE 1

| |
|---|
| 7.3.1.3.7 Format 2__6<br>DCI format 2__6 is used for notifying the power saving information outside DRX Active Time for one or more UEs.<br>The following information is transmitted by means of the DCI format 2__6 with CRC scrambled by PS-RNTI:<br>- block number 1, block number 2,젠, block number N<br>where the starting position of a block is determined by the parameter ps-PositionDCI-2-6 provided by higher layers for the UE configured with the block.<br>If the UE is configured with higher layer parameter PS-RNTI and dci-Format2-6, one block is configured for the UE by higher layers, with the following fields defined for the block:<br>- Wake-up indication - 1 bit<br>- SCell dormancy indication - 0 bit if higher layer parameter Scell-groups-for-dormancy-outside-active-time is not configured; otherwise 1, 2, 3, 4 or 5 bits bitmap determined according to higher layer parameter Scell-groups-for-dormancy-outside-active-time, where each bit corresponds to one of the SCell group(s) configured by higher layers parameter Scell-groups-for-dormancy-outside-active-time, with MSB to LSB of the bitmap corresponding to the first to last configured SCell group.<br>The size of DCI format 2__6 is indicated by the higher layer parameter sizeDCI-2-6, according to Clause 10.3 of TS 38.213. |

The method of monitoring DCI format 2_6 (WUS) according to the standard document has already been described in detail with reference to FIG. 6. In this document, DCI format 2_6 used as the WUS may be expressed as DCP. Thus, a PDCCH monitoring occasion for DCI format 2_6 may be referred to as a DCP occasion.

However, DCP is not limited to DCI format 2_6. For example, if DCI is to indicate the wake-up status within the DRX active time, DCI formats other than DCI format 2_6 may be interpreted as DCP.

For example, if the wake-up status within the DRX active time is notified in a DCI format other than DCI format 26, DCP may refer to the DCI format indicating the wake-up status.

Figure 7:
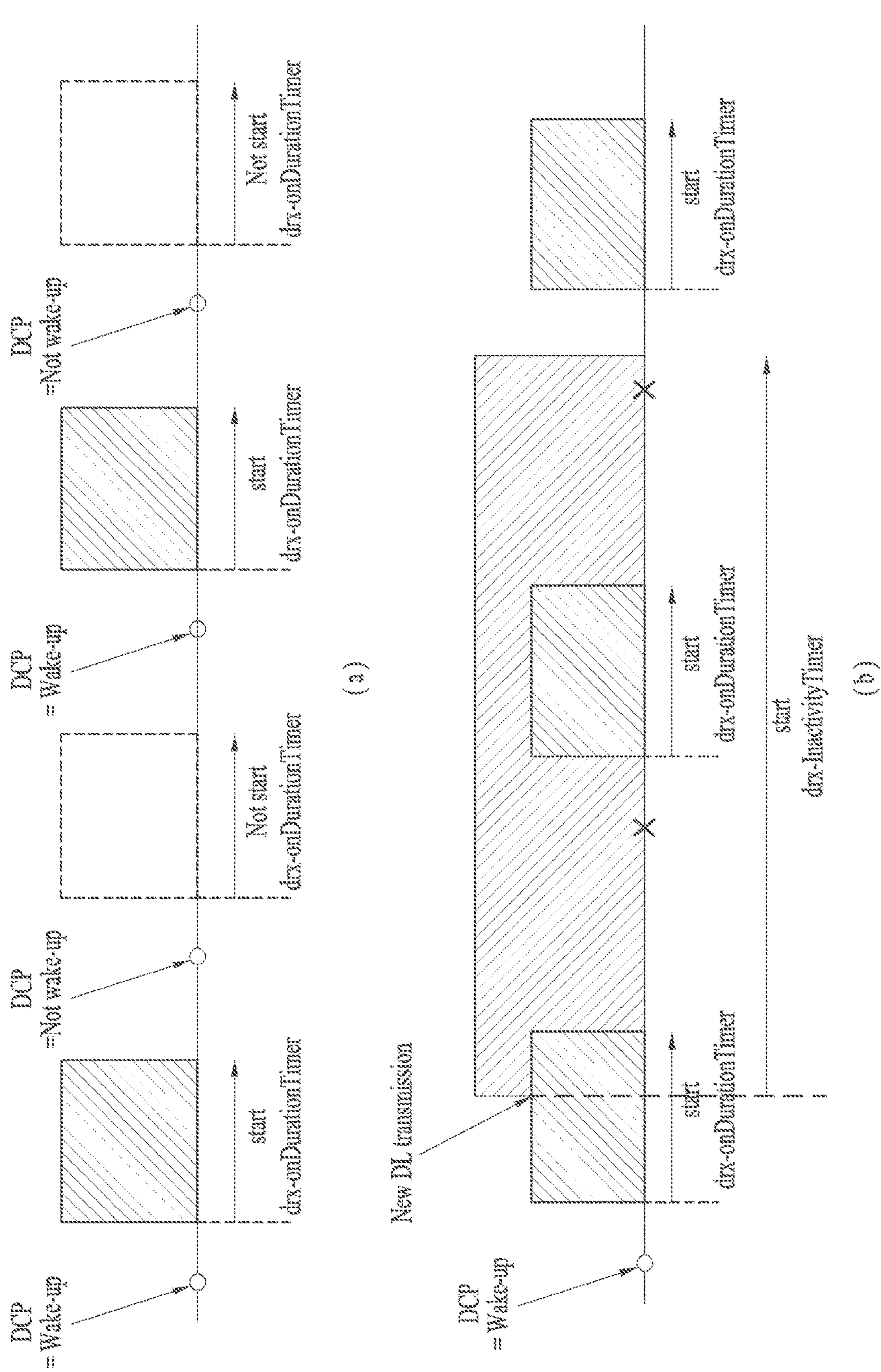

The location of a DCP occasion may be determined based on the DRX cycle of the UE as described above in FIG. 6. Accordingly, the wake-up operation of the UE based on the DCP occasion may be performed as shown in FIG. 7(*a*). In FIG. 7(*a*), the DCP occasion is simply expressed as a dot, but the actual DCP occasion (i.e., PDCCH monitoring occasion) is the same as shown in FIG. 6.

Referring to FIG. 7(*a*), as described in Table 1, whether the UE starts drx-onDurationTimer in the next DRX cycle is determined depending on whether a wake-up indication field of DCP (e.g., DCI format 2_6) is 0 or 1. For example, when the wake-up indication field is 0, it indicates "Not Wake-Up", and thus the UE does not start drx-onDurationTimer in the next DRX cycle. On the other hand, when the wake-up indication field is 1, it indicates "Wake-Up", and thus UE starts drx-onDurationTimer in the next DRX cycle.

Table 2 below shows the DRX active time defined in 3GPP TS 38.321.

TABLE 2

| |
|---|
| When DRX is configured, the Active Time for Serving Cells in a DRX group includes the time while:<br>- drx-onDurationTimer or drx-InactivityTimer configured for the DRX group is running; or<br>- drx-RetransmissionTimerDL or drx-RetransmissionTimerUL is running on any Serving Cell in the DRX group; or<br>- ra-ContentionResolutionTimer (as described in clause 5.1.5) or msgB-ResponseWindow (as described in clause 5.1.4a) is running; or<br>- a Scheduling Request is sent on PUCCH and is pending (as described in clause 5.4.4); or<br>- a PDCCH indicating a new transmission addressed to the C-RNTI of the MAC entity has not been received after successful reception of a Random Access Response for the Random Access Preamble not selected by the MAC entity among the contention-based Random Access Preamble (as described in clauses 5.1.4 and 5.1.4a). |

The UE starts drx-onDurationTimer and performs operations during the DRX active time. Thereafter, the DRX active time may be extended as defined in Table 2. In other words, when the timers defined in Table 2 are activated, the DRX active time may be extended. Meanwhile, the UE may be configured with at least one SS set for monitoring DCP, where the at least one SS set may be repeated at specific intervals.

Thus, if the DCP occasion repeats at specific intervals and the DRX active time is extended, the DCP occasion and DRX active time may overlap. In other words, the DCP occasion may be included within the extended DRX active time. In this case, the UE may be configured not to perform PDCCH monitoring on the DCP occasion included in the DRX active time and always start drx-onDurationTimer in the next DRX cycle. For example, referring to FIG. 7(*b*), since new DL transmission is received while drx-onDurationTimer is running, drx-InactivityTimer may start, and the DRX active time may be extended based on drx-InactivityTimer. In this case, the extended DRX active time may include DCP occasions allocated before drx-onDurationTimer in the next DRX cycle. However, in the current standard, DCP occasions within the DRX active time are defined not to be monitored. Therefore, the UE may not perform monitoring on DCP occasions included in the extended DRX active time. When the UE does not perform monitoring on the DCP occasions, the UE may not determine the wake-up status in the next DRX cycle corresponding to the DCP occasion. The wake-up status in the next DRX cycle may be defined through an RRC parameter ps-WakeUp. When ps-WakeUp is TRUE, even if the UE fails to detect DCP, the UE may start drx-onDurationTimer in the next DRX cycle and perform operations within the DRX active time. When ps-WakeUp is ABSENT, if the UE fails to detect DCP, the UE does not start drx-onDurationTimer in the next DRX cycle.

As described above, in Rel-17 power saving enhancement, it has been decided to introduce PDCCH monitoring adaptation to adjust PDCCH monitoring within the DRX active time. Additionally, as one form of PDCCH monitoring adaptation, PDCCH monitoring skipping has been included, which involves suspending PDCCH monitoring for a specific duration (e.g., PDCCH monitoring skipping duration). The duration of PDCCH skipping may be set to at least one of one or more symbols, one or more slots, or the entire remaining DRX active time of the current DRX cycle (skipping to the next DRX cycle). There is no defined UE PDCCH monitoring operations for cases where a PDCCH monitoring skipping duration within the DRX active time overlaps with a DCP occasion (for example, when the DCP occasion is included in the PDCCH monitoring skipping duration).

Therefore, the present disclosure proposes the following UE operation: when the UE is instructed to perform the C-DRX operation, the UE monitors a PDCCH on a DCP occasion included in a duration where PDCCH monitoring adaptation is applied. To this end, the present disclosure provides the definitions of the DRX active time in the duration where the PDCCH monitoring adaptation is applied and UE operations according to each definition. Additionally, the present disclosure proposes UE operations depending on possible PDCCH monitoring adaptation indications and UE operations when the UE is incapable of PDCCH monitoring on DCP occasions.

Although the methods proposed in the present disclosure are described based on C-DRX applied to the UE in the RRC_CONNECTED state, the methods are not limited thereto. For instance, it may be understood by those skilled in the art that the methods may be applied to other methods where a specific duration in which the UE does not need to expect reception of DL signals is defined with periodicity (for example, DRX applied to the UE in the RRC_IDLE state)

Thus, it is evident that unless specified otherwise, the methods proposed in the present disclosure are applicable to various types of transmission and reception methods expected by both the BS and UE as long as the principles of the proposed methods are not violated. Throughout this specification, the term “DRX” is used as a general concept encompassing the terms “C-DRX.”

While the present disclosure describes the principles of the proposed methods based on the NR system, the proposed methods are not limited to NR transmission and reception formats unless otherwise specified. The present disclosure provides examples based on the characteristics and structure of the UE supporting C-DRX to explain the principles of the proposed methods, the proposed methods are not limited to the UE supporting C-DRX unless otherwise specified. Therefore, the methods proposed in the present disclosure may be applied to the structure and services of all wireless communication transmission and reception unless the principles of the proposed methods are violated.

In the following description, the classification of methods or options is intended to clarify the description, and the classification is not limitedly interpreted to mean that each should be practiced independently. For example, although each of the methods/options described below may be independently implemented, but at least some of the methods/options may be combined to the extent that they do not conflict with each other.

In the present disclosure, the BS may indicate/configure the C-DRX operation when the UE is in the RRC_CONNECTED state and also indicate/configure UE operations when a DCP occasion is within a PDCCH monitoring adaptation duration, thereby not only improving the power saving efficiency of the UE but reducing the transmission/reception latency of control/traffic information.

To this end, the proposed methods may include a method by which the UE receives information on PDCCH monitoring on a DCP occasion from the BS and receives a PDCCH in SS set(s) on the DCP occasion based on the received information. The proposed methods may also include UE operations indicated/configured therefor. In addition, the methods may include a method by which the BS determines and configures information on PDCCH monitoring on a DCP occasion, provides the information to the UE, and transmits a PDCCH, a physical downlink shared channel (PDSCH), and/or a physical uplink shared channel (PUSCH) based on the information. Additionally, the proposed methods may include a process in which the UE transmits a signal and channel to inform the capability thereof and the BS receives the signal and channel.

The overall operation processes of the UE and BS according to the methods proposed in the present disclosure will be described with reference to FIGS. 8 to 10.

Figure 8:
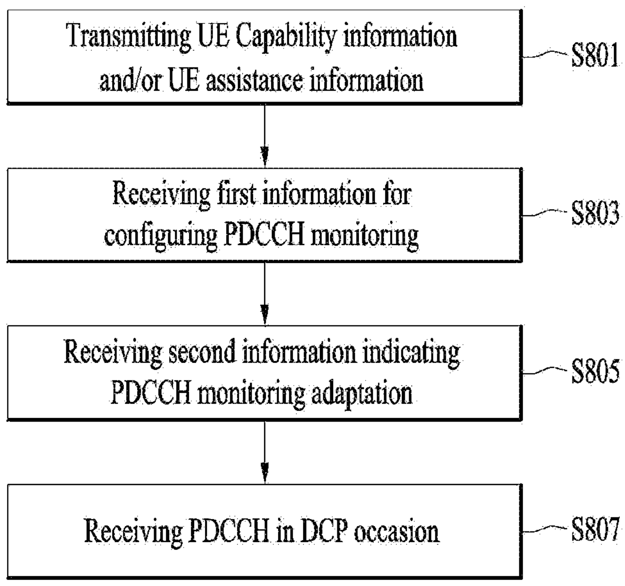
FIGS. 8 to 10 are diagrams for explaining the overall operation processes of a user equipment (UE) and a base station (BS) according to an embodiment of the present disclosure.

FIG. 8 is a diagram for explaining an overall operation process of the UE according to the methods proposed in the present disclosure.

Referring to FIG. 8, the UE may transmit capability information and/or UE assistance information to the BS to support the operations proposed in the present disclosure (S801). For example, the capability information and/or UE assistance information may include information for determining PDCCH monitoring on a DCP occasion. S801 may be omitted in specific cases (for example, when the BS already has the information or when each operation method is modified due to the needs of the BS).

The UE may receive first information for configuring the PDCCH monitoring, which is transmitted by the BS, to support the operations proposed in the present disclosure (S803). The first information may be received in a higher layer signal (e.g., system information block (SIB) or RRC signaling). For example, the first information may be for configuring PDCCH monitoring adaptation or configuring DCP monitoring in a PDCCH monitoring adaptation duration. The first information may be based on at least one of Method 1 to Method 3.

Alternatively, the first information may also be received based on a method of indicating one of a plurality of configurations related to PDCCH monitoring on multiple DCP occasions that are (semi-)statically provided to the UE (for example, through DCI or a MAC CE/header).

The UE may receive second information indicating the PDCCH monitoring adaptation based on the first information configured through the higher layer signal (S805). For example, the second information may be included in DCI. The corresponding DCI may be included in a PDCCH. The PDCCH monitoring adaptation indicated by the second information may be based on at least one of Method 1 to Method 3.

The UE may receive the PDCCH on the DCP occasion based on the second information and decode the PDCCH (S807). For example, the PDCCH received on the DCP occasion may include a WUS.

The above-described UE operations according to S803 to S807 may be based on at least one of Method 1 to Method 3.

Figure 9:
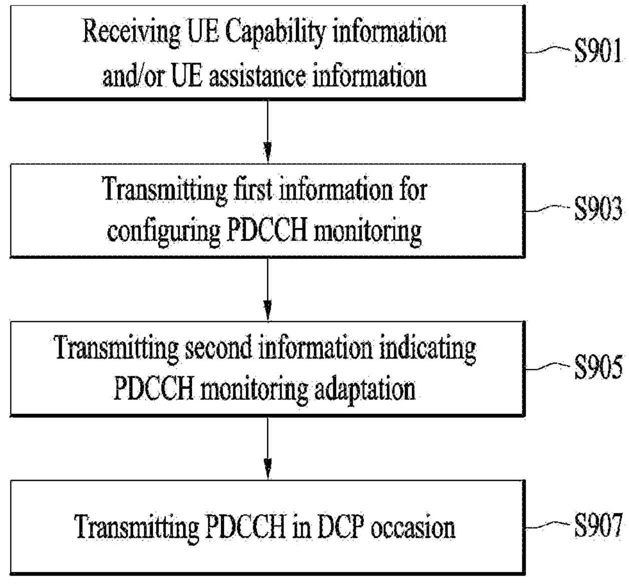

FIG. 9 is a diagram for explaining an overall operation process of the BS according to the methods proposed in the present disclosure.

Referring to FIG. 9, the BS may receive UE capability information and/or UE assistance information from the UE to support the operations proposed in the present disclosure (S901). For example, the capability information and/or UE assistance information may include information for determining PDCCH monitoring on a DCP occasion. S901 may be omitted in specific cases (for example, when the BS already has the information or when each operation method is modified due to the needs of the BS).

The BS may transmit first information for configuring PDCCH monitoring to support the operations proposed in the present disclosure (S903). The first information may be transmitted in a higher layer signal (e.g., SIB or RRC signaling). For example, the first information may be for configuring PDCCH monitoring adaptation or configuring DCP monitoring in a PDCCH monitoring adaptation duration. The first information may be based on at least one of Method 1 to Method 3.

Alternatively, the first information may also be transmitted based on a method of indicating one of a plurality of configurations related to PDCCH monitoring on multiple DCP occasions that are (semi-)statically provided to the UE (for example, through DCI or a MAC CE/header).

The BS may transmit second information indicating the PDCCH monitoring adaptation based on the first information configured through the higher layer signal (S905). For example, the second information may be included in DCI. The corresponding DCI may be included in a PDCCH. The PDCCH monitoring adaptation indicated by the second information may be based on at least one of Method 1 to Method 3.

The BS may transmit the PDCCH on the DCP occasion based on the second information (S907). For example, the PDCCH received on the DCP occasion may include a WUS.

The above-described BS operations according to S903 to S907 may be based on at least one of Method 1 to Method 3.

Figure 10:
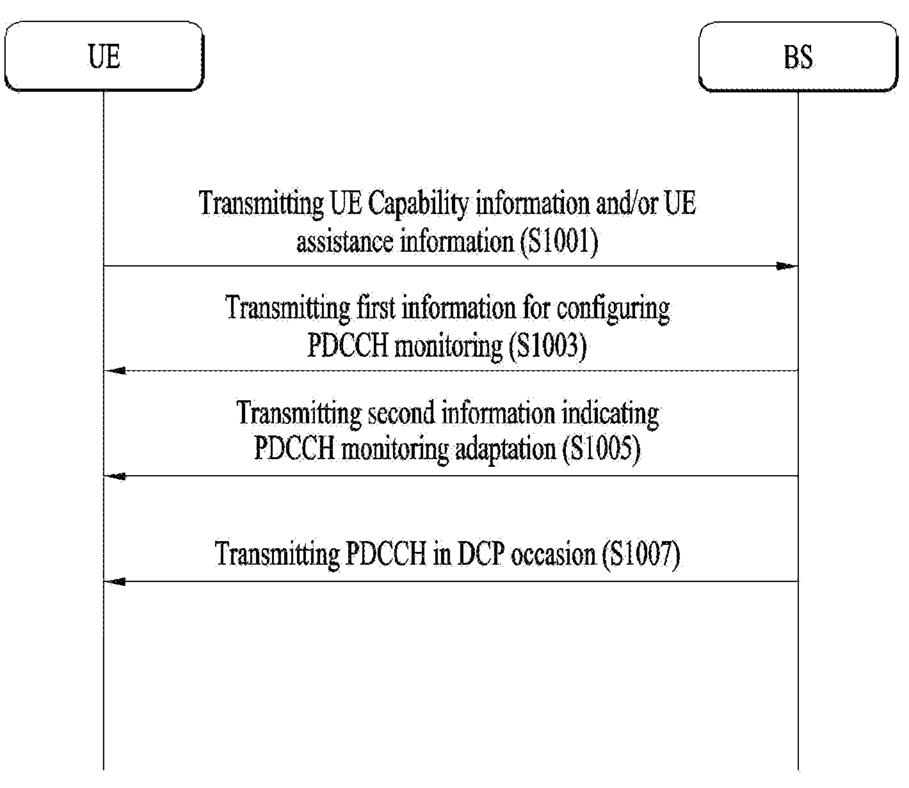

FIG. 10 is a diagram for explaining an overall operation process of a network according to the methods proposed in the present disclosure.

Referring to FIG. 10, the UE may transmit capability information and/or UE assistance information to the BS to support the operations proposed in the present disclosure (S1001). For example, the capability information and/or UE assistance information may include information for determining PDCCH monitoring on a DCP occasion. S1001 may be omitted in specific cases (for example, when the BS already has the information or when each operation method is modified due to the needs of the BS).

The BS may transmit first information for configuring PDCCH monitoring to the UE to support the operations proposed in the present disclosure (S1003). The first information may be transmitted in a higher layer signal (e.g., SIB or RRC signaling). For example, the first information may be for configuring PDCCH monitoring adaptation or configuring DCP monitoring in a PDCCH monitoring adaptation duration. The first information may be based on at least one of Method 1 to Method 3.

Alternatively, the first information may also be transmitted based on a method of indicating one of a plurality of configurations related to PDCCH monitoring on multiple DCP occasions that are (semi-)statically provided to the UE (for example, through DCI or a MAC CE/header).

The BS may transmit second information indicating the PDCCH monitoring adaptation based on the first information configured through the higher layer signal (1005). For example, the second information may be included in DCI. The corresponding DCI may be included in a PDCCH. The PDCCH monitoring adaptation indicated by the second information may be based on at least one of Method 1 to Method 3.

The BS may transmit the PDCCH on the DCP occasion based on the second information (S1007). For example, the PDCCH received on the DCP occasion may include a WUS.

The above-described BS operations according to S1003 to S1007 may be based on at least one of Method 1 to Method 3.

In other words, the methods proposed in the present disclosure may be applied by selecting some of the following methods. Each method may operate independently without any combinations, or one or more methods may operate in combination. Some of the terms, symbols, and orders used herein to describe the present disclosure may be replaced with other terms, symbols, and orders as long as the principles of the present disclosure are maintained.

Hereinafter, the principles of the methods proposed in the present disclosure will be described by providing illustrative examples of monitoring performed by the UE on DCP occasions. However, unless otherwise stated, the proposed methods are not limited to the type of UE operation.

Therefore, it is evident that unless specified otherwise, the methods proposed in the present disclosure are applicable to any PDCCH monitoring based on DCI transmission and reception as long as the principles of the proposed methods are not violated.

Figure 11:
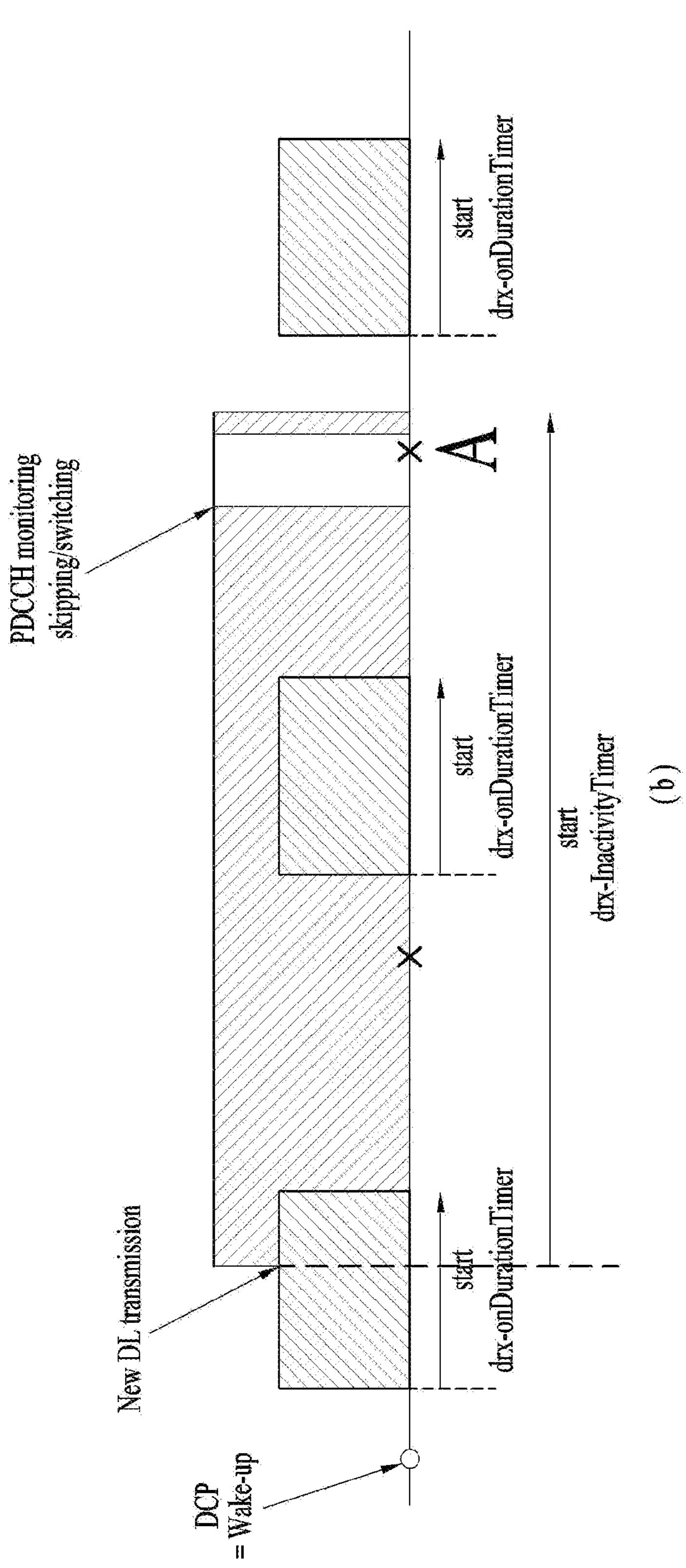
FIGS. 11 and 12 are diagrams for explaining methods of monitoring DCI format 2_6 according to an embodiment of the present disclosure.

As described above, when the UE is s performing the DRX operation after being instructed to perform the DRX operation, if PDCCH monitoring skipping is configured within a DRX active time, a PDCCH monitoring skipping duration and a DCP occasion may overlap as shown in FIG. 11. Referring to FIG. 11, the PDCCH monitoring adaptation duration (e.g., PDCCH monitoring skipping section or SSSG switching section) is configured within the DRX active time, which is extended due to drx-Inactivity Timer. The DCP occasion may be included in the configured PDCCH monitoring adaptation duration. However, as described above, there is no defined UE PDCCH monitoring operations for cases where the DCP occasion is included in the PDCCH monitoring adaptation duration. FIG. 11 illustrates a case in which the DCP occasion is included in the PDCCH monitoring adaptation duration as described above. In FIG. 11, the PDCCH monitoring skipping duration (or SSSG switching duration) in which PDCCH monitoring is not performed is indicated in white. In addition, the DCP occasion within the corresponding duration is denoted as A.

[Method 1] A PDCCH Monitoring Adaptation Duration within a DRX Active Time is Defined as not Part of the DRX Active Time, and the UE May Perform Monitoring of DCP (e.g., DCI Format 2_6) on a DCP Occasion within the Corresponding Duration.

Table 3 shows the DRX operation of the UE extracted from 3GPP TS 38.321.

TABLE 3

| |
|---|
| The MAC entity may be configured by RRC with a DRX functionality that controls the UE's PDCCH monitoring activity for the MAC entity's C-RNTI, CI-RNTI, CS-RNTI, INT-RNTI, SFI-RNTI, SP-CSI-RNTI, TPC-PUCCH-RNTI, TPC-PUSCH-RNTI, TPC-SRS-RNTI, and AI-RNTI. When using DRX operation, the MAC entity shall also monitor PDCCH according to requirements found in other clauses of this specification. When in RRC_CONNECTED, if DRX is configured, for |

TABLE 3-continued

| |
|---|
| all the activated Serving Cells, the MAC entity may monitor the PDCCH discontinuously using the DRX operation specified in this clause; otherwise the MAC entity shall monitor the PDCCH as specified in TS 38.213 [6]. |

When the UE stops PDCCH monitoring due to a PDCCH monitoring skipping indication, it may be defined that the PDCCH monitoring skipping duration is not part of the DRX active time. This is because the UE is capable of performing monitoring on the DCP occasion when the UE is not in the DRX active time. Therefore, considering that the PDCCH monitoring skipping duration is not part of the DRX active time, monitoring of DCP (e.g., DCI format 2_6) on the DCP occasion may be allowed.

In other words, Method 1 proposes that the PDCCH monitoring adaptation duration is defined as not part of the DRX active time, and the UE receives a wake-up indication by monitoring the DCP (e.g., DCI format 2_6) on the DCP occasion. Accordingly, the UE may determine whether to wake up in the next DRX cycle and receive a PDCCH.

According to Method 1, it is expected to achieve power saving benefits compared to the conventional operation, where the UE should start next drx-onDurationTimer. For example, according to the conventional operation, the UE may not monitor the DCP occasion within the DRX active time if the UE is in the PDCCH monitoring adaptation duration. Consequently, since the UE is incapable of receiving the DCP, the UE should start drx-onDurationTimer in the next DRX cycle based on the standard operation definition if ps-Wake Up is TRUE.

However, if the BS instructs PDCCH monitoring adaptation involving the PDCCH monitoring skipping duration or SSSG switching duration within the DRX active time, it may imply that the BS has little or no data to transmit for a certain period of time. However, even when the BS has no or little data to transmit, if the DCP occasion is included in the PDCCH monitoring adaptation duration, and if the UE does not receive the DCP (e.g., DCI format 26) and starts drx-onDurationTimer in the next DRX cycle, the UE may unnecessarily continue to perform the PDCCH monitoring in the next DRX cycle, which causes unnecessary power consumption.

Therefore, Method 1 defines that the PDCCH monitoring adaptation duration is as not part of the DRX active time, allowing for monitoring of the DCP within the PDCCH monitoring adaptation duration, thereby preventing the unnecessary power consumption as described above.

According to Method 1, the PDCCH monitoring adaptation duration is set as not part of the DRX active time, which means that a DRX-related timer may not be counted during the corresponding duration. For example, when the PDCCH monitoring adaptation duration starts, the counting of the DRX-related timer may be paused. When the PDCCH monitoring adaptation duration ends, the counting of the DRX-related timer may be resumed. Additionally, the counter value at the time of resumption may be the same as the counter value at the time of pause.

According to Method 1, if the UE is instructed to perform PDCCH monitoring skipping until the next DRX cycle (for example, until or beyond the start point of drx-onDurationTimer in the next DRX cycle), the UE may immediately terminate all currently running DRX timers. For example, if drx-onDurationTimer, drx-InactivityTimer, drx-RetransmissionTimerDL, drx-Retransmission Timer UL, ra-ContentionResolutionTimer, and/or msgB-ResponseWindow are operating or counting, the UE may immediately terminate all timers, which may be defined as part of the DRX active time, allowing the DRX active time to expire.

For example, if the UE initiates drx-InactivityTimer due to new DL transmission after starting drx-onDurationTimer based on a WUS transmitted from the BS, the DRX active time may be extended. Thereafter, the BS may instruct the UE to perform the PDCCH monitoring skipping for a certain period of time or to completely terminate the current DRX cycle due to the absence of expected data traffic. In this case, the UE may monitor the DCP occasion during the PDCCH monitoring skipping duration to receive a wake-up indication for the next DRX cycle, thereby achieving power saving benefits as described above.

The UE operations of Method 1 may also be applied to SSSG switching. For the SSSG switching, even when switching to SSSG#1 is instructed for power saving purposes, it may be difficult to define a related duration as not part of the DRX active time because the UE monitors a PDCCH for a prescribed number of SS sets. However, both the PDCCH monitoring skipping and switching to SSSG#1 are for the same purpose of power saving. Therefore, even if the UE receives an SSSG switching indication (for example, switching to SSSG#1), the UE may be allowed to perform the PDCCH monitoring on the DCP occasion, thereby achieving power saving benefits.

[Method 2] When a DCP Occasion within a DRX Active Time is Located within an Indicated PDCCH Monitoring Adaptation Duration, the UE May Perform Monitoring on a Monitoring Occasion (MO) (i.e., DCP Occasion).

The purpose of PDCCH monitoring skipping is to stop PDCCH monitoring during the DRX active time. If a DRX timer is paused during the PDCCH monitoring skipping duration as described in Method 1, the PDCCH monitoring may not be performed, but the DRX active time may be extended by the remaining duration of the timer that is paused after the PDCCH monitoring skipping duration. That is, the DRX active time may be resumed for the remaining duration of the paused timer.

However, resuming the DRX active time may not align with the definition of the PDCCH monitoring skipping, which aims to stop the PDCCH monitoring during the DRX active time without extending the DRX active time. Therefore, even if the UE stops the PDCCH monitoring due to a PDCCH monitoring skipping indication, the corresponding PDCCH monitoring skipping duration may still be part of the DRX active time if DRX timers such as drx-onDurationTimer and/or drx-InactivityTimer are not paused. Therefore, Method 2 proposes a method of allowing the UE to perform monitoring on a DCP occasion even if the PDCCH monitoring adaptation duration is included within the DRX active time.

The reason why upon receiving the PDCCH monitoring skipping indication, the UE stops the PDCCH monitoring while drx-InactivityTimer or drx-onDurationTimer is running is to achieve power saving benefits. For example, the PDCCH monitoring skipping indication may be an indication to stop the PDCCH monitoring for the entire DRX active time from a specific duration or the point in time when the PDCCH monitoring skipping is indicated (or the point in time when the PDCCH monitoring skipping is applied).

For example, if the UE starts drx-InactivityTimer by receiving data and the DRX active time is extended, but if it is determined that there is no future transmission expected, the BS may instruct the UE to skip the PDCCH monitoring during the rest of the DRX active time for power saving. Due to the instruction, there may be a duration in which the UE does not perform the PDCCH monitoring within the DRX active time. In other words, although the UE is within the DRX active time, the UE may perform the same operation as when the UE is not within the DRX active time.

However, when the BS instructs the PDCCH monitoring skipping due to the absence of expected data traffic and the PDCCH monitoring skipping duration includes the DCP occasion, if the UE is incapable of monitoring a WUS included in DCP (e.g. DCI format 2_6) in the next DRX cycle, the UE needs to unconditionally start drx-onDurationTimer in the next DRX cycle. However, when the UE unconditionally starts drx-onDurationTimer in the next DRX cycle because the UE is incapable of monitoring the WUS, it may be detrimental in terms of power saving for the UE as described above. This may be equally applicable to SSSG switching, which is one of the monitoring adaptation technologies for power saving purposes.

Therefore, if the DCP occasion within the DRX active time is located within the PDCCH monitoring adaptation duration (for example, position A in FIG. 11), the UE may determine whether to wake up in the next DRX cycle to perform the PDCCH monitoring on the DCP occasion and receive WUS information, thereby achieving power saving benefits.

[Method 2-1] if a DCP Occasion Included in a DRX Active Time is Located within a PDCCH Monitoring Adaptation Duration, the UE May Perform PDCCH Monitoring on the Corresponding MO (i.e., DCP Occasion) Based on a PS-RNTI.

DCI capable of being monitored on the DCP occasion may be DCI format 2_6 used for the existing WUS. According to Method 2-1, the limitation that the UE is capable of monitoring DCI format 2_6 only outside the DRX active time may be removed. In other words, even within the DRX active time, the UE may perform monitoring on the MO (e.g., DCP occasion) of a Type3-PDCCH CSS with the PS-RNTI.

The PS-RNTI is not an RNTI controlled by DRX functionality as described in Table 3. Thus, even if the PDCCH monitoring within DRX active time is stopped by a PDCCH monitoring skipping indication, the UE may perform monitoring with the PS-RNTI.

The MO (e.g., DCP occasion) for DCI format 2_6 corresponds to the first full duration within a PDCCH monitoring window as shown in FIG. 6. Therefore, if the PDCCH monitoring window is located within the PDCCH monitoring adaptation duration (e.g., PDCCH monitoring skipping duration), the UE may monitor DCI format 2_6 in the same way as when the UE monitors DCI format 2_6 including a WUS outside the DRX active time.

Alternatively, even if the PDCCH monitoring window is not entirely included within the PDCCH monitoring adaptation duration, i.e., if the PDCCH monitoring window and PDCCH monitoring adaptation duration overlaps at least partially, the UE may monitor DCI format 2_6 in the same way as when the UE monitors DCI format 2_6 including a WUS outside the DRX active time.

Figure 12:
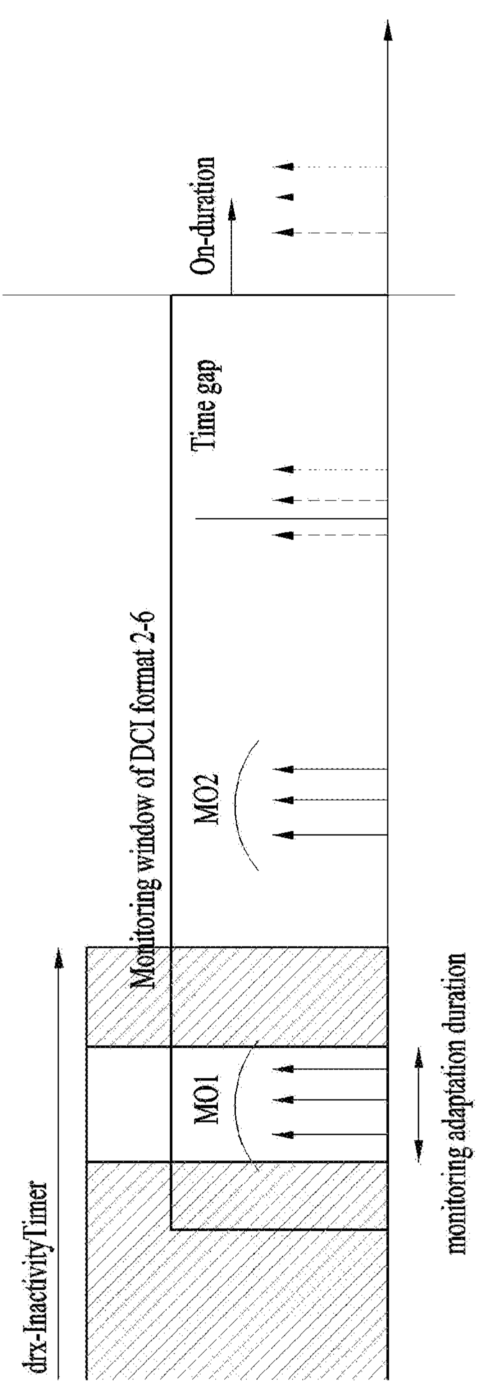

For example, referring to FIG. 12, MO1 in the PDCCH monitoring window for DCI format 2_6 is included in the PDCCH monitoring adaptation duration. Therefore, although MO1 is within the DRX active time, the UE may monitor DCI format 2_6 on MO1.

However, if the UE fails to detect DCI format 2_6 on MO1, the UE may monitor DCI format 2_6 on MO2. This is because since MO2 is in the PDCCH monitoring window other than the DRX active time, the UE may perform monitoring in the same way as in the prior art.

That is, if the PDCCH monitoring window and PDCCH monitoring adaptation duration overlap at least partially and the MO of DCI format 2_6 is located within the overlapping part, the UE may monitor DCI format 2_6 on the corresponding MO.

Therefore, when the UE is configured to perform the operations proposed in Method 2-1 or when the UE is capable of performing the operations proposed in Method 2-1, the UE may monitor DCI format 2_6 on MO1 or MO2 with the PS-RNTI. In the case of MO1, since MO1 is located within the PDCCH monitoring adaptation duration although MO1 is within the DRX active time, the UE may perform PDCCH monitoring on the corresponding DCP occasion (i.e., MO1) with the PS-RNTI. On the other hand, in the case of MO2, since MO2 is not with the DRX active time but is a DCP occasion within the PDCCH monitoring window, the UE may monitor DCI format 26 including a WUS can be monitored at the corresponding location as in the prior art.

In the scenarios shown in FIG. 12, the BS may configure/indicate whether the UE needs to monitor MO1 first or whether the UE needs to monitor MO2 without monitoring MO1. Alternatively, if there are no predetermined configurations, it may be determined by default that the UE performs one of the following operations: the UE monitors MO1 first, or the UE monitors MO2 without monitoring MO1.

According to Method 2-1, the UE may monitor DCP (e.g., DCI format 26) without additional definitions for the DRX active time. In addition, as described in Method 1, the UE may monitor DCP (e.g., DCI format 26) within the DRX active time, thereby achieving power saving benefits.

In addition, the PDCCH monitoring adaptation duration is also considered as the DRX active time and a DRX timer is counted therefor, it may also better align with the purpose of DRX for power saving.

[Method 2-2] if a DCP Occasion Included in a DRX Active Time is Located within a PDCCH Monitoring Adaptation Duration, the UE May Perform Monitoring on the Corresponding MO (e.g., DCP Occasion) with a Cell Radio Network Radio Network Temporary Identifier (C-RNTI).

In some cases, the UE may not be allowed to perform monitoring within the DRX active time with a PS-RNTI according to Method 2-1. In this case, the UE may use a C-RNTI for WUS monitoring on the DCP occasion within the PDCCH monitoring adaptation duration. In general, SS set(s) configurable as the DCP occasion is the Type3-PDCCH CSS, and in the SS set, monitoring is possible with various RNTIs in addition to the PS-RNTI. Among the various RNTIs, the UE may use the C-RNTI, which is used for PDSCH/PUSCH scheduling, to perform the WUS monitoring in the corresponding SS set.

For C-RNTI based monitoring on DCP occasions, other DCI formats 2_6 as well as DCI format 26 may be used. For example, there may be DCI format 1_1 for SCell dormancy case 2. Since DCI format 1_1 for SCell dormancy case 2 include no scheduling information, DCI format 1_1 for SCell dormancy case 2 is also referred to as non-scheduling DCI format 1_1. Specific fields of up to 19 bits related to scheduling can be used for an SCell dormancy indication.

In this case, the remaining field bits except for those used for the SCell dormancy indication may be used for a WUS indication. That is, among the maximum 19 bits related to scheduling, the remaining bits except for those used for the SCell dormancy indication may be used for the WUS indication.

Thus, a one-bit WUS indication is included in DCI format 1_1 for SCell dormancy case 2, and the UE may monitor DCI format 1_1 in the Type3-PDCCH CSS with the C-RNTI. The UE may determine whether to wake up in the next DRX cycle based on the one-bit WUS indication included in DCI format 1_1.

As another example, other DCI formats considered for PDCCH monitoring adaptation in Rel-17 power saving may be used. All DCI formats capable of indicating PDCCH monitoring adaptation may be used for the WUS indication without limitations to a specific DCI format. At least one bit may be used to indicate the PDCCH monitoring adaptation, and the bit value of a field indicating the PDCCH monitoring adaptation may be interpreted differently depending on the DCP occasion.

For example, when the UE receives DCI indicating the PDCCH monitoring adaptation in SS set(s) corresponding to the DCP occasion (e.g., Type3-PDCCH CSS), the UE may interpret the field indicating the corresponding PDCCH monitoring adaptation as the WUS indication. In other words, although the BS transmits the same DCI format in the SS set(s) corresponding to the DCP occasion, the DCI format may be used as the WUS indication. Additionally, if a field for PDCCH monitoring adaptation exceeds one bit, the field may be used to indicate other operations as well as the WUS indications. For example, the BS may indicate an SSSG to be monitored in the next DRX cycle together with the wake-up status.

In the scenario shown in FIG. 12, according to Method 2-2, the UE may monitor DCP on MO1 with a C-RNTI and monitor DCP on MO2 with a PS-RNTI in MO2. In Method 2-2, the BS may configure/indicate each operation to the UE, or the default operation of the UE may be determined as in Method 2-1.

According to Method 2-2, the UE may receive the WUS indication within the PDCCH monitoring adaptation duration, even without changing and/or adding the definitions of the DRX active time or the reception time of DCI format 2_6. Therefore, it is possible to receive the WUS indication within the PDCCH monitoring duration by only adding/changing the definitions of DCI fields without no change in the UE operations defined in the standard document, thereby simplifying the implementation of the UE. In addition, the backward compatibility of the UE may be guaranteed. As mentioned in Method 1 and Method 2-1, even if no or little data are expected based on the configuration of the PDCCH monitoring duration, the UE may start drx-onDurationTimer in the next DRX cycle, thereby preventing unnecessary power consumption of the UE.

[Method 3] Monitoring Methods and Operations for the UE when a DCP Occasion Included within a DRX Active Time is within a PDCCH Monitoring Adaptation Duration Method 3 propose methods and operations in which the UE performs monitoring on a DCP occasion within a PDCCH monitoring duration when the UE is capable of performing the methods proposed in Method 1 to Method 2.

When the UE is instructed to perform SSSG switching, the UE may monitor one or more SS sets. The UE may perform PDCCH monitoring in the Type3-PDCCH CSS with a PS-RNTI or C-RNTI. If the currently monitored SSSG include any SS sets related to the DCP occasion, the UE may be allowed to perform monitoring on DCP occasions included within the PDCCH monitoring duration as shown in Case A of FIG. 11. As shown in FIG. 12, the UE may be exceptionally allowed to perform monitoring on DCP occasions only in slots located in an area where and the PDCCH monitoring adaptation duration overlaps with a PDCCH monitoring window.

Alternatively, whether the UE should wake up in the next DRX cycle may be implicitly determined based on the currently monitored SSSG. For instance, if the UE is monitoring SSSG#1 on the DCP occasion, which is configured to reduce the PDCCH monitoring frequency for power saving purposes, the UE may enter the sleep mode in the next DRX cycle. Conversely, if the UE is monitoring SSSG#0 on the DCP occasion, which is configured to increase the PDCCH monitoring frequency for data-efficient purposes, the UE may wake up in the next DRX cycle. Alternatively, as in the existing NR UE operation, when ps-WakeUp is TRUE, if the UE fails to detect DCP, the UE may wake-up in the next DRX cycle. The UE operations may be configured/instructed by the BS, or the default UE operation may be determined when there are no configurations/indications.

When the UE is instructed to perform PDCCH monitoring skipping, whether the UE monitors the DCP may be determined in various ways. Hence, there may be a need for a precise definition of the operation related to the PDCCH monitoring skipping. If the PDCCH monitoring skipping indication is applied to only an RNTI controlled by DRX functionality, DCP (e.g., DCI format 26) monitoring based on the PS-RNTI of the UE may be performed according to Method 2-1 without any issues.

However, if the PDCCH monitoring skipping indication is applied to all PDCCHs of the UE, it may also impact DCI monitoring based on not only a C-RNTI but also the PS-RNTI. In this case, even while the UE is performing the PDCCH monitoring skipping, the UE may be temporarily allowed to monitor DCI on the DCP occasion with the C-RNTI or PS-RNTI.

However, if the monitoring is not allowed to obtain the power saving gains of micro-sleep based on the PDCCH monitoring skipping indication, the UE may perform DCI monitoring on an MO (e.g., DCP occasion) before or after the PDCCH monitoring skipping duration. For example, if the PDCCH monitoring skipping duration indicated to the UE at least partially overlaps with the PDCCH monitoring window for DCP (e.g., DCI format 26), the UE may perform DCI monitoring on an MO (e.g., DCP occasion) of the Type3-PDCCH CSS set, which may be located before or after the PDCCH monitoring skipping duration. If the MO (e.g., DCP occasion) is located both before and after the PDCCH monitoring skipping duration, the location may be selected depending on the implementation of the UE or configured/indicated by the BS.

According to Method 3, the DCI monitoring method according to Method 1 to Method 2 may be implemented more effectively. For example, in various scenarios that may occur according to Method 1 to Method 2, the most efficient method for monitoring DCI including a WUS based on PDCCH monitoring adaptation may be applied.

The various descriptions, functions, procedures, proposals, methods, and/or operation flowcharts of the present disclosure described herein may be applied to, but not limited to, various fields requiring wireless communication/connectivity (e.g., 5G) between devices.

More specific examples will be described below with reference to the drawings. In the following drawings/description, like reference numerals denote the same or corresponding hardware blocks, software blocks, or function blocks, unless otherwise specified.

Figure 13:
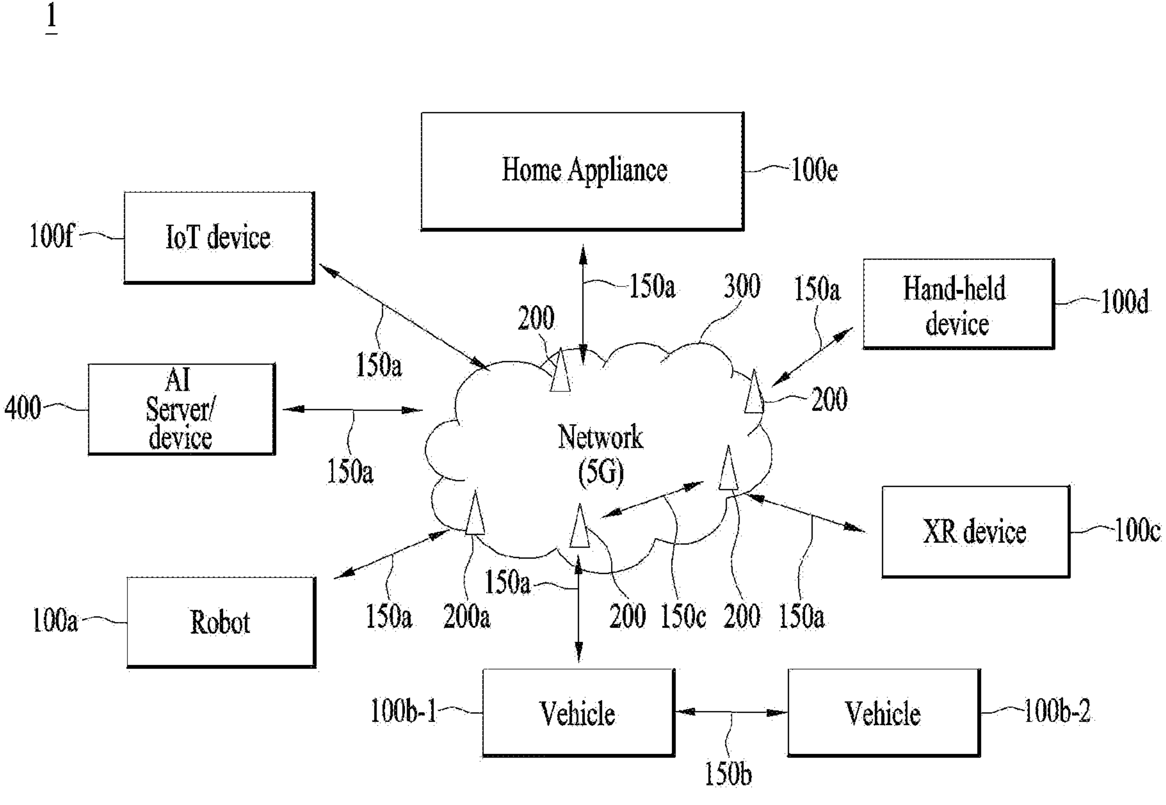
FIG. 13 illustrates an exemplary communication system applied to the present disclosure.

FIG. 13 illustrates a communication system 1 applied to the present disclosure.

Referring to FIG. 13, the communication system 1 applied to the present disclosure includes wireless devices, BSs, and a network. A wireless device is a device performing communication using radio access technology (RAT) (e.g., 5G NR (or New RAT) or LTE), also referred to as a communication/radio/5G device. The wireless devices may include, not limited to, a robot 100*a*, vehicles 100*b*-1 and 100*b*-2, an extended reality (XR) device 100*c*, a hand-held device 100*d*, a home appliance 100*e*, an IoT device 100*f*, and an artificial intelligence (AI) device/server 400. For example, the vehicles may include a vehicle having a wireless communication function, an autonomous driving vehicle, and a vehicle capable of vehicle-to-vehicle (V2V) communication. Herein, the vehicles may include an unmanned aerial vehicle (UAV) (e.g., a drone). The XR device may include an augmented reality (AR)/virtual reality (VR)/mixed reality (MR) device and may be implemented in the form of a head-mounted device (HMD), a head-up display (HUD) mounted in a vehicle, a television (TV), a smartphone, a computer, a wearable device, a home appliance, a digital signage, a vehicle, a robot, and so on. The hand-held device may include a smartphone, a smartpad, a wearable device (e.g., a smartwatch or smartglasses), and a computer (e.g., a laptop). The home appliance may include a TV, a refrigerator, a washing machine, and so on. The IoT device may include a sensor, a smartmeter, and so on. For example, the BSs and the network may be implemented as wireless devices, and a specific wireless device 200*a* may operate as a BS/network node for other wireless devices.

The wireless devices 100*a* to 100*f* may be connected to the network 300 via the BSs 200. An AI technology may be applied to the wireless devices 100*a* to 100*f*, and the wireless devices 100*a* to 100*f* may be connected to the AI server 400 via the network 300. The network 300 may be configured using a 3G network, a 4G (e.g., LTE) network, or a 5G (e.g., NR) network. Although the wireless devices 100*a* to 100*f* may communicate with each other through the BSs 200/network 300, the wireless devices 100*a* to 100*f* may perform direct communication (e.g., sidelink communication) with each other without intervention of the BSs/network. For example, the vehicles 100*b*-1 and 100*b*-2 may perform direct communication (e.g. V2V/vehicle-to-everything (V2X) communication). The IoT device (e.g., a sensor) may perform direct communication with other IoT devices (e.g., sensors) or other wireless devices 100*a* to 100*f*.

Wireless communication/connections 150*a*, 150*b*, and 150*c* may be established between the wireless devices 100*a* to 100*f*/BS 200 and between the BSs 200. Herein, the wireless communication/connections may be established through various RATs (e.g., 5G NR) such as UL/DL communication 150*a*, sidelink communication 150*b* (or, D2D communication), or inter-BS communication (e.g. relay or integrated access backhaul (IAB)). Wireless signals may be transmitted and received between the wireless devices, between the wireless devices and the BSs, and between the BSs through the wireless communication/connections 150*a*, 150*b*, and 150*c*. For example, signals may be transmitted and receive don various physical channels through the wireless communication/connections 150*a*, 150*b* and 150*c*. To this end, at least a part of various configuration information configuring processes, various signal processing processes (e.g., channel encoding/decoding, modulation/demodulation, and resource mapping/demapping), and resource allocation processes, for transmitting/receiving wireless signals, may be performed based on the various proposals of the present disclosure.

Figure 14:
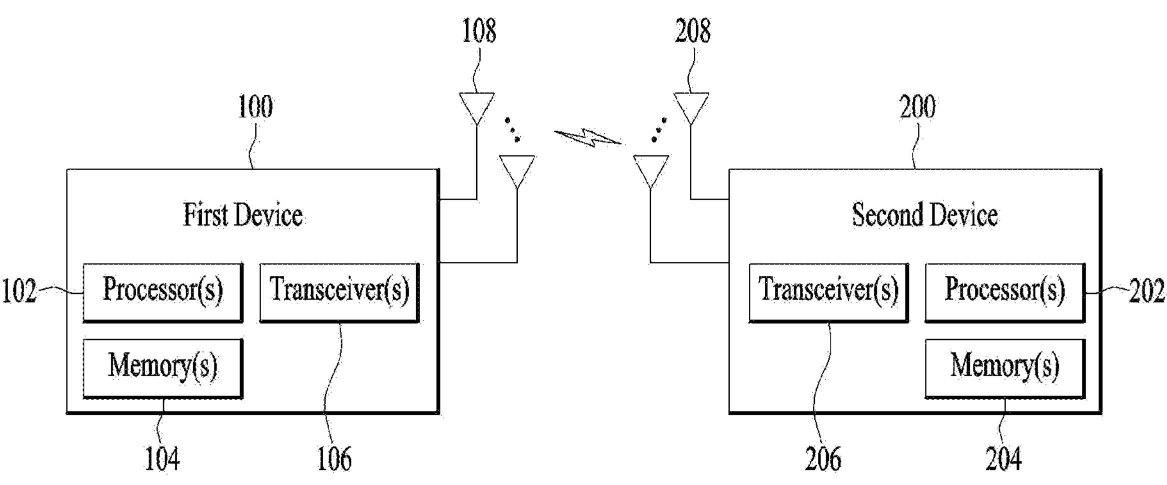
FIG. 14 illustrates an exemplary wireless device applicable to the present disclosure.

FIG. 14 illustrates wireless devices applicable to the present disclosure.

Referring to FIG. 14, a first wireless device 100 and a second wireless device 200 may transmit wireless signals through a variety of RATs (e.g., LTE and NR). {The first wireless device 100 and the second wireless device 200} may correspond to {the wireless device 100*x* and the BS 200} and/or {the wireless device 100*x* and the wireless device 100*x*} of FIG. 13.

The first wireless device 100 may include one or more processors 102 and one or more memories 104, and further include one or more transceivers 106 and/or one or more antennas 108. The processor(s) 102 may control the memory(s) 104 and/or the transceiver(s) 106 and may be configured to implement the descriptions, functions, procedures, proposals, methods, and/or operation flowcharts disclosed in this document. For example, the processor(s) 102 may process information in the memory(s) 104 to generate first information/signals and then transmit wireless signals including the first information/signals through the transceiver(s) 106. The processor(s) 102 may receive wireless signals including second information/signals through the transceiver(s) 106 and then store information obtained by processing the second information/signals in the memory(s) 104. The memory(s) 104 may be connected to the processor(s) 102 and may store various pieces of information related to operations of the processor(s) 102. For example, the memory(s) 104 may store software code including instructions for performing all or a part of processes controlled by the processor(s) 102 or for performing the descriptions, functions, procedures, proposals, methods, and/or operation flowcharts disclosed in this document. The processor(s) 102 and the memory(s) 104 may be a part of a communication modem/circuit/chip designed to implement RAT (e.g., LTE or NR). The transceiver(s) 106 may be connected to the processor(s) 102 and transmit and/or receive wireless signals through the one or more antennas 108. Each of the transceiver(s) 106 may include a transmitter and/or a receiver. The transceiver(s) 106 may be interchangeably used with radio frequency (RF) unit(s). In the present disclosure, the wireless device may be a communication modem/circuit/chip.

Specifically, instructions and/or operations, controlled by the processor(s) 102 of the first wireless device 100 and stored in the memory(s) 104 of the first wireless device 100, according to an embodiment of the present disclosure will now be described.

Although the following operations will be described based on a control operation of the processor(s) 102 in terms of the processor(s) 102, software code for performing such an operation may be stored in the memory 104. For example, in the present disclosure, the at least one memory(s) 104 may store instructions or programs as a computer-readable storage medium. The instructions or the programs may cause, when executed, at least one processor operably connected to the at least one memory to perform operations according to embodiments or implementations of the present disclosure, related to the following operations.

The processor(s) 102 may transmit capability information and/or UE assistance information to the BS to support the operations proposed in the present disclosure. For example, the capability information and/or UE assistance information may include information for determining PDCCH monitoring on a DCP occasion. However, transmitting the capability information and/or UE assistance information may be omitted in specific cases (for example, when the BS already has the information or when each operation method is modified due to the needs of the BS).

The processor(s) 102 may receive first information for configuring the PDCCH monitoring, which is transmitted by the BS, through the transceiver(s) 106 to support the operations proposed in the present disclosure. The first information may be received through the transceiver(s) 106 in a higher layer signal (e.g., SIB or RRC signaling). For example, the first information may be for configuring PDCCH monitoring adaptation or configuring DCP monitoring in a PDCCH monitoring adaptation duration. The first information may be based on at least one of Method 1 to Method 3.

Alternatively, the first information may also be received through the transceiver(s) 106 based on a method of indicating one of a plurality of configurations related to PDCCH monitoring on multiple DCP occasions that are (semi-) statically provided to the processor(s) 102 (for example, through DCI or a MAC CE/header).

The processor(s) 102 may receive second information indicating the PDCCH monitoring adaptation through the transceiver(s) 106 based on the first information configured through the higher layer signal. For example, the second information may be included in DCI. The corresponding DCI may be included in a PDCCH. The PDCCH monitoring adaptation indicated by the second information may be based on at least one of Method 1 to Method 3.

The processor(s) 102 may receive the PDCCH on the DCP occasion through the transceiver(s) 106 based on the second information and decode the PDCCH (S807). For example, the PDCCH received on the DCP occasion may include a WUS.

For example, the above-described operations of the processor(s) 102 may be based on at least one of Method 1 to Method 3.

The second wireless device 200 may include one or more processors 202 and one or more memories 204, and further include one or more transceivers 206 and/or one or more antennas 208. The processor(s) 202 may control the memory (s) 204 and/or the transceiver(s) 206 and may be configured to implement the descriptions, functions, procedures, proposals, methods, and/or operation flowcharts disclosed in this document. For example, the processor(s) 202 may process information in the memory(s) 204 to generate third information/signals and then transmit wireless signals including the third information/signals through the transceiver(s) 206. The processor(s) 202 may receive wireless signals including fourth information/signals through the transceiver(s) 106 and then store information obtained by processing the fourth information/signals in the memory(s) 204. The memory(s) 204 may be connected to the processor(s) 202 and store various pieces of information related to operations of the processor(s) 202. For example, the memory(s) 204 may store software code including instructions for performing all or a part of processes controlled by the processor(s) 202 or for performing the descriptions, functions, procedures, proposals, methods, and/or operation flowcharts disclosed in this document. The processor(s) 202 and the memory(s) 204 may be a part of a communication modem/circuit/chip designed to implement RAT (e.g., LTE or NR). The transceiver(s) 206 may be connected to the processor(s) 202 and transmit and/or receive wireless signals through the one or more antennas 208. Each of the transceiver(s) 206 may include a transmitter and/or a receiver. The transceiver(s) 206 may be interchangeably used with RF unit(s). In the present disclosure, the wireless device may be a communication modem/circuit/chip.

Specifically, instructions and/or operations, controlled by the processor(s) 202 of the second wireless device 200 and stored in the memory(s) 204 of the second wireless device 200, according to an embodiment of the present disclosure will now be described.

Although the following operations will be described based on a control operation of the processor(s) 202 in terms of the processor(s) 202, software code for performing such an operation may be stored in the memory(s) 204. For example, in the present disclosure, the at least one memory(s) 204 may store instructions or programs as a computer-readable storage medium. The instructions or the programs may cause, when executed, at least one processor operably connected to the at least one memory to perform operations according to embodiments or implementations of the present disclosure, related to the following operations.

The processor(s) 202 may receive UE capability information and/or UE assistance information from the UE to support the operations proposed in the present disclosure (S901). For example, the capability information and/or UE assistance information may include information for determining PDCCH monitoring on a DCP occasion. However, receiving the UE capability information and/or UE assistance information through the transceiver(s) 206 may be omitted in specific cases (for example, when the processor(s) 202 already has the information or when each operation method is modified due to the needs of the processor(s) 202).

The processor(s) 202 may transmit first information for configuring PDCCH monitoring through the transceiver(s) 206 to support the operations proposed in the present disclosure. The first information may be transmitted through the transceiver(s) 206 in a higher layer signal (e.g., SIB or RRC signaling). For example, the first information may be for configuring PDCCH monitoring adaptation or configuring DCP monitoring in a PDCCH monitoring adaptation duration. The first information may be based on at least one of Method 1 to Method 3.

Alternatively, the first information may also be transmitted based on a method of indicating one of a plurality of configurations related to PDCCH monitoring on multiple DCP occasions that are (semi-)statically provided to the UE (for example, through DCI or a MAC CE/header).

The BS may transmit second information indicating the PDCCH monitoring adaptation through the transceiver(s) 206 based on the first information configured through the higher layer signal. For example, the second information may be included in DCI. The corresponding DCI may be included in a PDCCH. The PDCCH monitoring adaptation indicated by the second information may be based on at least one of Method 1 to Method 3.

The processor(s) 202 may transmit the PDCCH on the DCP occasion through the transceiver(s) 206 based on the second information (S907). For example, the PDCCH received on the DCP occasion may include a WUS.

The above-described operations of the processor(s) 202 may be based on at least one of Method 1 to Method 3.

Now, hardware elements of the wireless devices 100 and 200 will be described in greater detail. One or more protocol layers may be implemented by, not limited to, one or more processors 102 and 202. For example, the one or more processors 102 and 202 may implement one or more layers (e.g., functional layers such as physical (PHY), medium access control (MAC), radio link control (RLC), packet data convergence protocol (PDCP), RRC, and service data adaptation protocol (SDAP)). The one or more processors 102 and 202 may generate one or more protocol data units (PDUs) and/or one or more service data Units (SDUs) according to the descriptions, functions, procedures, proposals, methods, and/or operation flowcharts disclosed in this document. The one or more processors 102 and 202 may generate messages, control information, data, or information according to the descriptions, functions, procedures, proposals, methods, and/or operation flowcharts disclosed in this document and provide the messages, control information, data, or information to one or more transceivers 106 and 206. The one or more processors 102 and 202 may generate signals (e.g., baseband signals) including PDUs, SDUs, messages, control information, data, or information according to the descriptions, functions, procedures, proposals, methods, and/or operation flowcharts disclosed in this document and provide the generated signals to the one or more transceivers 106 and 206. The one or more processors 102 and 202 may receive the signals (e.g., baseband signals) from the one or more transceivers 106 and 206 and acquire the PDUs, SDUs, messages, control information, data, or information according to the descriptions, functions, procedures, proposals, methods, and/or operation flowcharts disclosed in this document.

The one or more processors 102 and 202 may be referred to as controllers, microcontrollers, microprocessors, or microcomputers. The one or more processors 102 and 202 may be implemented by hardware, firmware, software, or a combination thereof. For example, one or more application specific integrated circuits (ASICs), one or more digital signal processors (DSPs), one or more digital signal processing devices (DSPDs), one or more programmable logic devices (PLDs), or one or more field programmable gate arrays (FPGAs) may be included in the one or more processors 102 and 202. The descriptions, functions, procedures, proposals, methods, and/or operation flowcharts disclosed in this document may be implemented using firmware or software, and the firmware or software may be configured to include the modules, procedures, or functions. Firmware or software configured to perform the descriptions, functions, procedures, proposals, methods, and/or operation flowcharts disclosed in this document may be included in the one or more processors 102 and 202 or may be stored in the one or more memories 104 and 204 and executed by the one or more processors 102 and 202. The descriptions, functions, procedures, proposals, methods, and/or operation flowcharts disclosed in this document may be implemented using firmware or software in the form of code, an instruction, and/or a set of instructions.

The one or more memories 104 and 204 may be connected to the one or more processors 102 and 202 and store various types of data, signals, messages, information, programs, code, instructions, and/or commands. The one or more memories 104 and 204 may be configured to include read-only memories (ROMs), random access memories (RAMs), electrically erasable programmable read-only memories (EPROMs), flash memories, hard drives, registers, cash memories, computer-readable storage media, and/or combinations thereof. The one or more memories 104 and 204 may be located at the interior and/or exterior of the one or more processors 102 and 202. The one or more memories 104 and 204 may be connected to the one or more processors 102 and 202 through various technologies such as wired or wireless connection.

The one or more transceivers 106 and 206 may transmit user data, control information, and/or wireless signals/channels, mentioned in the methods and/or operation flowcharts of this document, to one or more other devices. The one or more transceivers 106 and 206 may receive user data, control information, and/or wireless signals/channels, mentioned in the descriptions, functions, procedures, proposals, methods, and/or operation flowcharts disclosed in this document, from one or more other devices. For example, the one or more transceivers 106 and 206 may be connected to the one or more processors 102 and 202 and transmit and receive wireless signals. For example, the one or more processors 102 and 202 may perform control so that the one or more transceivers 106 and 206 may transmit user data, control information, or wireless signals to one or more other devices. The one or more processors 102 and 202 may perform control so that the one or more transceivers 106 and 206 may receive user data, control information, or wireless signals from one or more other devices. The one or more transceivers 106 and 206 may be connected to the one or more antennas 108 and 208 and the one or more transceivers 106 and 206 may be configured to transmit and receive user data, control information, and/or wireless signals/channels, mentioned in the descriptions, functions, procedures, proposals, methods, and/or operation flowcharts disclosed in this document, through the one or more antennas 108 and 208. In this document, the one or more antennas may be a plurality of physical antennas or a plurality of logical antennas (e.g., antenna ports). The one or more transceivers 106 and 206 may convert received wireless signals/channels from RF band signals into baseband signals in order to process received user data, control information, and wireless signals/channels using the one or more processors 102 and 202. The one or more transceivers 106 and 206 may convert the user data, control information, and wireless signals/channels processed using the one or more processors 102 and 202 from the baseband signals into the RF band signals. To this end, the one or more transceivers 106 and 206 may include (analog) oscillators and/or filters.

Figure 15:
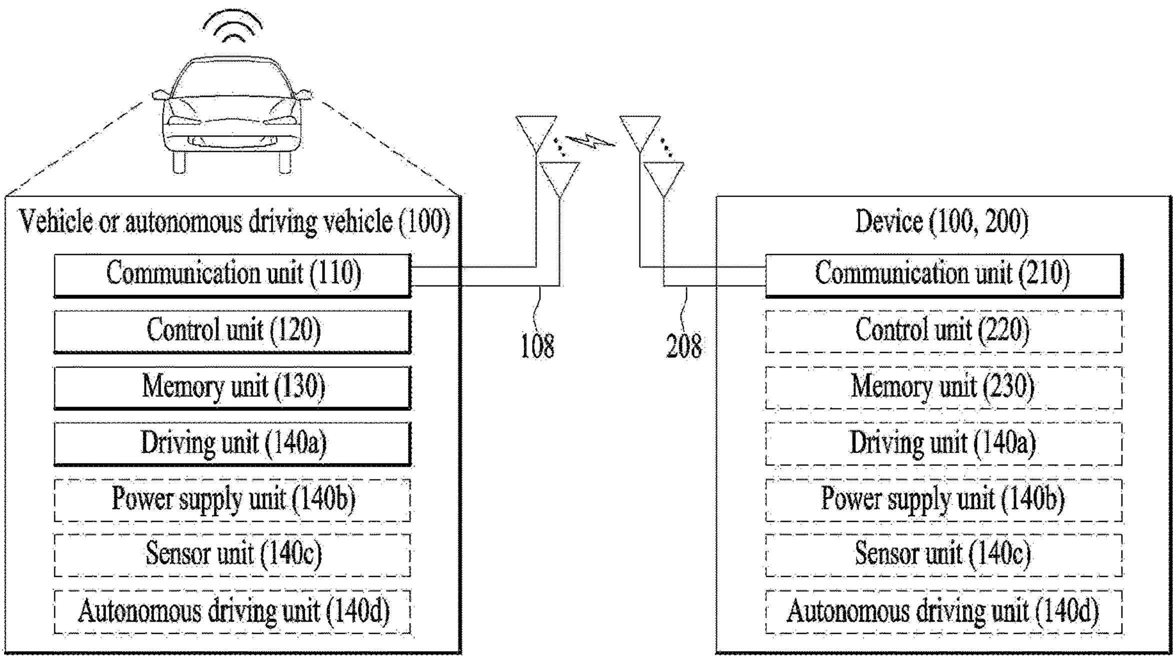
FIG. 15 illustrates an exemplary vehicle or autonomous driving vehicle applicable to the present disclosure.

FIG. 15 illustrates a vehicle or an autonomous driving vehicle applied to the present disclosure. The vehicle or autonomous driving vehicle may be implemented as a mobile robot, a car, a train, a manned/unmanned aerial vehicle (AV), a ship, or the like.

Referring to FIG. 15 a vehicle or autonomous driving vehicle 100 may include an antenna unit 108, a communication unit 110, a control unit 120, a driving unit 140*a*, a power supply unit 140*b*, a sensor unit 140*c*, and an autonomous driving unit 140*d*. The antenna unit 108 may be configured as a part of the communication unit 110.

The communication unit 110 may transmit and receive signals (e.g., data and control signals) to and from external devices such as other vehicles, BSs (e.g., gNBs and road side units), and servers. The control unit 120 may perform various operations by controlling elements of the vehicle or the autonomous driving vehicle 100. The control unit 120 may include an ECU. The driving unit 140*a* may enable the vehicle or the autonomous driving vehicle 100 to drive on a road. The driving unit 140*a* may include an engine, a motor, a powertrain, a wheel, a brake, a steering device, and so on. The power supply unit 140*b* may supply power to the vehicle or the autonomous driving vehicle 100 and include a wired/wireless charging circuit, a battery, and so on. The sensor unit 140*c* may acquire information about a vehicle state, ambient environment information, user information, and so on. The sensor unit 140*c* may include an inertial measurement unit (IMU) sensor, a collision sensor, a wheel sensor, a speed sensor, a slope sensor, a weight sensor, a heading sensor, a position module, a vehicle forward/backward sensor, a battery sensor, a fuel sensor, a tire sensor, a steering sensor, a temperature sensor, a humidity sensor, an ultrasonic sensor, an illumination sensor, a pedal position sensor, and so on. The autonomous driving unit 140*d* may implement technology for maintaining a lane on which the vehicle is driving, technology for automatically adjusting speed, such as adaptive cruise control, technology for autonomously driving along a determined path, technology for driving by automatically setting a route if a destination is set, and the like.

For example, the communication unit 110 may receive map data, traffic information data, and so on from an external server. The autonomous driving unit 140_d_ may generate an autonomous driving route and a driving plan from the obtained data. The control unit 120 may control the driving unit 140_a_ such that the vehicle or autonomous driving vehicle 100 may move along the autonomous driving route according to the driving plan (e.g., speed/direction control). During autonomous driving, the communication unit 110 may aperiodically/periodically acquire recent traffic information data from the external server and acquire surrounding traffic information data from neighboring vehicles. During autonomous driving, the sensor unit 140_c_ may obtain information about a vehicle state and/or surrounding environment information. The autonomous driving unit 140_d_ may update the autonomous driving route and the driving plan based on the newly obtained data/information. The communication unit 110 may transfer information about a vehicle position, the autonomous driving route, and/or the driving plan to the external server. The external server may predict traffic information data using AI technology based on the information collected from vehicles or autonomous driving vehicles and provide the predicted traffic information data to the vehicles or the autonomous driving vehicles.

Figure 16:
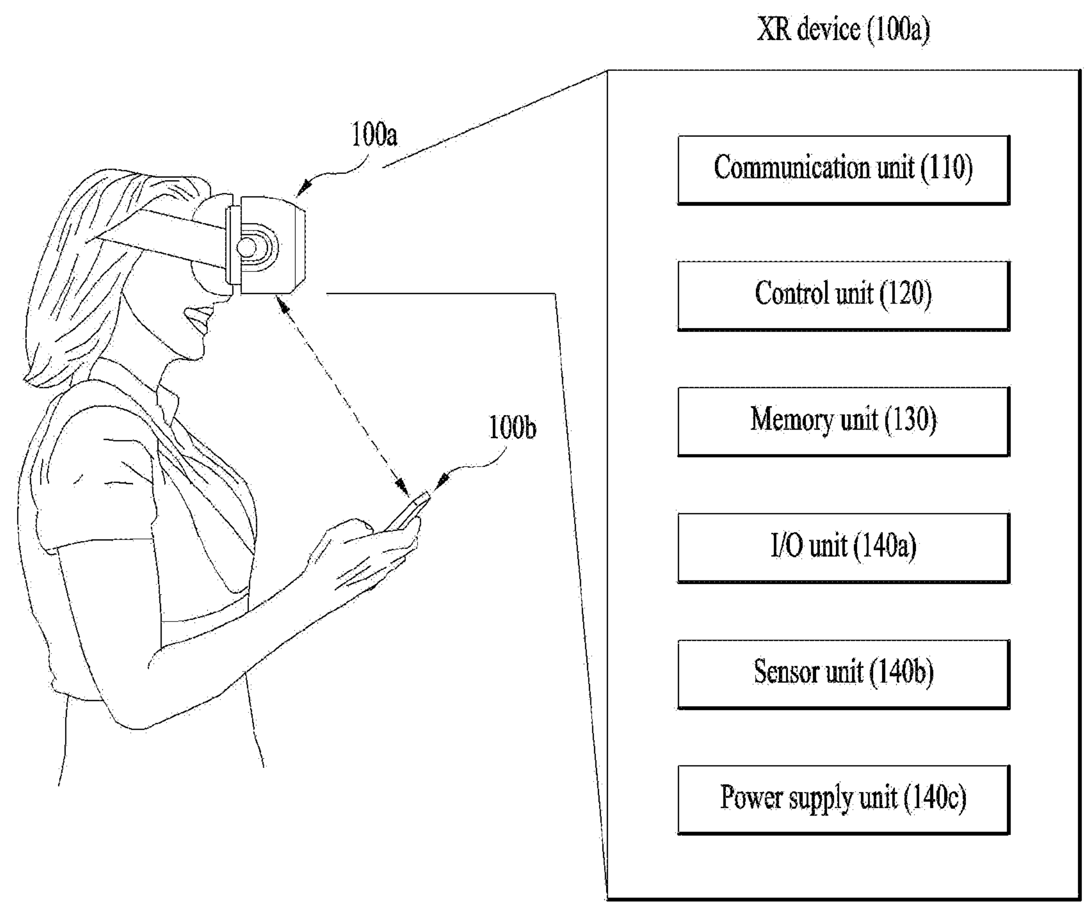
FIG. 16 illustrates an extended reality (XR) device applicable to the present disclosure.

FIG. 16 illustrates an XR device applied to the present disclosure. The XR device may be implemented by an HMD, an HUD mounted in a vehicle, a television, a smartphone, a computer, a wearable device, a home appliance, a digital signage, a vehicle, a robot, etc.

Referring to FIG. 16, an XR device 100_a_ may include a communication unit 110, a control unit 120, a memory unit 130, an I/O unit 140_a_, a sensor unit 140_b_, and a power supply unit 140_c_.

The communication unit 110 may transmit and receive signals (e.g., media data and control signals) to and from external devices such as other wireless devices, hand-held devices, or media servers. The media data may include video, images, and sound. The control unit 120 may perform various operations by controlling constituent elements of the XR device 100_a_. For example, the control unit 120 may be configured to control and/or perform procedures such as video/image acquisition, (video/image) encoding, and metadata generation and processing. The memory unit 130 may store data/parameters/programs/code/commands needed to drive the XR device 100_a_/generate XR object. The I/O unit 140_a_ may obtain control information and data from the exterior and output the generated XR object. The I/O unit 140_a_ may include a camera, a microphone, a user input unit, a display unit, a speaker, and/or a haptic module. The sensor unit 140_b_ may obtain an XR device state, surrounding environment information, user information, etc. The sensor unit 140_b_ may include a proximity sensor, an illumination sensor, an acceleration sensor, a magnetic sensor, a gyro sensor, an inertial sensor, an RGB sensor, an IR sensor, a fingerprint recognition sensor, an ultrasonic sensor, a light sensor, a microphone and/or a radar. The power supply unit 140_c_ may supply power to the XR device 100_a_ and include a wired/wireless charging circuit, a battery, etc.

For example, the memory unit 130 of the XR device 100_a_ may include information (e.g., data) needed to generate the XR object (e.g., an AR/VR/MR object). The I/O unit 140_a_ may receive a command for manipulating the XR device 100_a_ from a user and the control unit 120 may drive the XR device 100_a_ according to a driving command of a user. For example, when a user desires to watch a film or news through the XR device 100_a_, the control unit 120 transmits content request information to another device (e.g., a hand-held device 100_b_) or a media server through the communication unit 130. The communication unit 130 may download/stream content such as films or news from another device (e.g., the hand-held device 100_b_) or the media server to the memory unit 130. The control unit 120 may control and/or perform procedures such as video/image acquisition, (video/image) encoding, and metadata generation/processing with respect to the content and generate/output the XR object based on information about a surrounding space or a real object obtained through the I/O unit 140_a_/sensor unit 140_b_.

The XR device 100_a_ may be wirelessly connected to the hand-held device 100_b_ through the communication unit 110 and the operation of the XR device 100_a_ may be controlled by the hand-held device 100_b_. For example, the hand-held device 100_b_ may operate as a controller of the XR device 100_a_. To this end, the XR device 100_a_ may obtain information about a 3D position of the hand-held device 100_b_ and generate and output an XR object corresponding to the hand-held device 100_b_.

The embodiments of the present disclosure described herein below are combinations of elements and features of the present disclosure. The elements or features may be considered selective unless otherwise mentioned. Each element or feature may be practiced without being combined with other elements or features. Further, an embodiment of the present disclosure may be constructed by combining parts of the elements and/or features. Operation orders described in embodiments of the present disclosure may be rearranged. Some constructions of any one embodiment may be included in another embodiment and may be replaced with corresponding constructions of another embodiment. It will be obvious to those skilled in the art that claims that are not explicitly cited in each other in the appended claims may be presented in combination as an embodiment of the present disclosure or included as a new claim by a subsequent amendment after the application is filed.

In the present disclosure, a specific operation described as performed by the BS may be performed by an upper node of the BS in some cases. Namely, it is apparent that, in a network comprised of a plurality of network nodes including a BS, various operations performed for communication with an MS may be performed by the BS, or network nodes other than the BS. The term 'BS' may be replaced with the term 'fixed station', 'Node B', 'enhanced Node B (eNode B or eNB)', 'access point', etc.

Those skilled in the art will appreciate that the present disclosure may be carried out in other specific ways than those set forth herein without departing from the spirit and essential characteristics of the present disclosure. The above embodiments are therefore to be construed in all aspects as illustrative and not restrictive. The scope of the disclosure should be determined by the appended claims and their legal equivalents, not by the above description, and all changes coming within the meaning and equivalency range of the appended claims are intended to be embraced therein.

While the above-described method of transmitting and receiving a signal in an unlicensed band and an apparatus therefor have been described based on an example applied to a 5G NR system, the method and apparatus are applicable to various wireless communication systems in addition to the 5G NR system.

What is claimed is:

1. A method of receiving downlink control information (DCI) by a user equipment (UE) in a wireless communication system, the method comprising:

receiving first information on discontinuous reception (DRX);

running a timer for a DRX active time based on the first information;

receiving second information on physical downlink control channel (PDCCH) monitoring adaptation based on the DRX active time;

performing the PDCCH monitoring adaptation for a predetermined duration based on the second information; and based on inclusion of a PDCCH monitoring occasion for a wake-up signal (WUS) within a duration in which the DRX active time and the predetermined duration overlap with each other, receiving DCI including the WUS on the PDCCH monitoring occasion.

2. The method of claim 1, wherein the overlapping duration is not considered as the DRX active time.

3. The method of claim 1, wherein the DCI is received even based on that the overlapping duration is considered as the DRX active time.

4. The method of claim 1, wherein the DCI is received based on a power saving radio network temporary identifier (PS-RNTI).

5. The method of claim 1, wherein the DCI is received based on a cell radio network temporary identifier (C-RNTI), and wherein the DCI has a different format from DCI format 2_6.

6. The method of claim 1, wherein the PDCCH monitoring occasion corresponds to a Type3-PDCCH common search space (CSS).

7. A user equipment (UE) configured to receive downlink control information (DCI) in a wireless communication system, the UE comprising:

at least one transceiver;

at least one processor; and at least one memory operably connected to the at least one processor and configured to store instructions that, when executed, cause the at least one processor to perform operations comprising:

receiving first information on discontinuous reception (DRX) through the at least one transceiver;

running a timer for a DRX active time based on the first information;

receiving second information on physical downlink control channel (PDCCH) monitoring adaptation through the at least one transceiver based on the DRX active time;

performing the PDCCH monitoring adaptation for a predetermined duration based on the second information; and based on inclusion of a PDCCH monitoring occasion for a wake-up signal (WUS) within a duration in which the DRX active time and the predetermined duration overlap with each other, receiving DCI including the WUS on the PDCCH monitoring occasion through the at least one transceiver.

8. The UE of claim 7, wherein the overlapping duration is not considered as the DRX active time.

9. The UE of claim 7, wherein the DCI is received even based on that the overlapping duration is considered as the DRX active time.

10. The UE of claim 7, wherein the DCI is received based on a power saving radio network temporary identifier (PS-RNTI).

11. The UE of claim 7, wherein the DCI is received based on a cell radio network temporary identifier (C-RNTI), and wherein the DCI has a different format from DCI format 2_6.

12. The UE of claim 7, wherein the PDCCH monitoring occasion corresponds to a Type3-PDCCH common search space (CSS).

13. A base station (BS) configured to transmit downlink control information (DCI) in a wireless communication system, the BS comprising:

at least one transceiver;

at least one processor; and at least one memory operably connected to the at least one processor and configured to store instructions that, when executed, cause the at least one processor to perform operations comprising:

transmitting first information on discontinuous reception (DRX) through the at least one transceiver;

transmitting second information on physical downlink control channel (PDCCH) monitoring adaptation through the at least one transceiver based on a DRX active time, wherein the DRX active time is based on the first information; and based on inclusion of a PDCCH monitoring occasion for a wake-up signal (WUS) within a duration in which the DRX active time overlaps with a predetermined duration in which the PDCCH monitoring adaptation is performed based on the second information, transmitting DCI including the WUS on the PDCCH monitoring occasion through the at least one transceiver.

* * * * *